United States Patent
Sato et al.

(10) Patent No.: US 7,379,950 B2
(45) Date of Patent: May 27, 2008

(54) DOCUMENT PROCESSING METHOD, PROGRAM AND APPARATUS FOR PROCESSING A DOCUMENT FILE IN PAGES

(75) Inventors: Junko Sato, Kanagawa (JP); Junichiro Kizaki, Kanagawa (JP); Satoshi Nishikawa, Kanagawa (JP); Yasuo Mori, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 10/734,262

(22) Filed: Dec. 15, 2003

(65) Prior Publication Data

US 2004/0139389 A1 Jul. 15, 2004

(30) Foreign Application Priority Data

Dec. 20, 2002 (JP) ............................. 2002-371003

(51) Int. Cl.
 *G06F 7/00* (2006.01)
(52) U.S. Cl. .................... 707/104.1; 382/176; 707/102
(58) Field of Classification Search ................ 382/176; 715/530, 500.1; 707/104.1, 100, 203, 1, 707/3, 10, 102
 See application file for complete search history.

(56) References Cited

U.S. PATENT DOCUMENTS 5,222,236 A * 6/1993 Potash et al. ............... 707/102
5,765,177 A * 6/1998 Nakatsuyama et al. ..... 715/514
5,933,599 A * 8/1999 Nolan ......................... 715/734
6,253,193 B1 * 6/2001 Ginter et al. ................. 705/57
6,442,516 B1 * 8/2002 Lee et al. ....................... 704/8
6,738,787 B2 * 5/2004 Stead ...................... 707/104.1
2003/0056179 A1 3/2003 Mori ........................... 715/530
2003/0056180 A1 3/2003 Mori ........................... 715/530

FOREIGN PATENT DOCUMENTS

| JP | 5-108631 | 4/1993 |
|---|---|---|
| JP | 2001-280756 A | 10/2001 |
| JP | 2003-091518 | 3/2003 |

* cited by examiner

*Primary Examiner*—Sathyanarayan Pannala
(74) *Attorney, Agent, or Firm*—Fitzpatrick, Cella, Harper & Scinto

(57) ABSTRACT

A document processing technique which provides an editing function of, e.g., combining separately created document files into one document file is disclosed. When an instruction to insert the second document file to the first document file displayed in the display region is input, candidates for the insertion method of the second document file in inserting the second document file to the first document file are presented in accordance with the input instruction. The second document file is inserted to the first document file on the basis of the insertion method selected from the presented candidates.

15 Claims, 37 Drawing Sheets

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | DOCUMENT SIZE / FIXED SIZE | • Z-FOLD IS DESIGNATED WHEN "A4 + A3", "B4 + B3", OR "LETER + LEDGER (11 × 17)" IS DESIGNATED<br>• DOCUMENT SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | • DESIGNATION IS POSSIBLE INDIVIDUALLY IN LOGICAL OR PHYSICAL PAGES<br>• ALL CHAPTERS / PAGES ARE TARGETED |

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | DOCUMENT SIZE / FIXED SIZE | • Z-FOLD IS DESIGNATED WHEN "A4 + A3", "B4 + B3" OR "LETER + LEDGER (11 × 17)" IS DESIGNATED<br>• DOCUMENT SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | • DESIGNATION IS POSSIBLE INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER/FOOTER | | • DESIGNATION IS POSSIBLE INDIVIDUALLY IN LOGICAL OR PHYSICAL PAGES<br>• ALL CHAPTERS/PAGES ARE TARGETED |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ENLARGEMENT & REDUCTION DESIGNATION/BINDING MARGIN/FASCICLE DESIGNATION, etc | • ONLY IN BOOKBINDING PRINTING |
| 11 | FRONT/BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | SLIP SHEET | | • FEED PORT (INCLUDING INSERTER) IS DESIGNATED<br>• DOCUMENT DATA CAN BE PRINTED ON INSERTED PAPER<br>• BOOKBINDING PRINTING CANNOT BE DESIGNATED |
| 14 | CHAPTERING | "NONE"/"PAGE BREAK"/ "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | DOCUMENT SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER<br>PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING DESIGNATION | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON/OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK<br>DEFAULT VALUE IS "ON" |

FIG. 6

| NO | ATTRIBUTE INFORMATION | | REMARKS |
|---|---|---|---|
| 1 | PAGE ROTATION DESIGNATION | | • 0° / 90° / 180° / 270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

DOCUMENT PROCESSING METHOD, PROGRAM AND APPARATUS FOR PROCESSING A DOCUMENT FILE IN PAGES

FIELD OF THE INVENTION

The present invention relates to a document processing technique which provides an editing function of, e.g., combining separately created document files into one document file.

BACKGROUND OF THE INVENTION

Different types of data such as characters, tables, and images require different structures which define the data and different editing operations for the data. Various application programs are provided in accordance with the type of data. The user uses different application programs for different types of data to be edited: for example, a character processing program in order to edit characters, a spreadsheet program in order to edit tables, and an image editing program in order to edit images.

In this manner, the user generally uses different application programs for different types of data to be edited. However, a document to be created by the user generally contains a plurality of types of data such as characters and tables or characters and images, rather than a document formed by only one type of data such as characters, tables, or images. To create a target document containing a plurality of types of data, the user must print data by various applications using their printing functions, and combine printed materials in a desired order.

There is known a print preview function of, before actually printing on a paper sheet in printing data such as a document or image edited by an application program for editing a document or image, displaying an image to be printed in a printing layout on the display and presenting the preview to the user.

Application software which combines data generated by various applications into one document has been devised. The present applicant has filed a mechanism disclosed in Japanese Patent Application No. 2001-280756. This system has a function of displaying a hierarchical structure of chapters, pages, and the like as a document structure in a tree format simultaneously when displaying a preview of a loaded document. The user can newly add a chapter or page to an existing document by directly inserting files created by various applications to the tree display region by drag-and-drop.

In this system, however, the user cannot perform detailed settings such as a chapter structure when inserting an object such as a document file or image file to the tree display region in the preview window by drag-and-drop. For example, whether to insert a dragged/dropped document as a chapter or page is automatically determined by the application (fixed such that a document is inserted as a chapter or an image file is inserted as a page), and cannot be designated by the user.

SUMMARY OF THE INVENTION

The present invention has been made in consideration of the above situation, and has as its object to provide a document processing technique capable of easily setting the document structure of a document file when inserting the document file into a predetermined document file.

One aspect of the present invention implements a document processing method and apparatus for providing an editing function of, e.g., combining separately created document files into one document file. When an instruction to insert the second document file to the first document file displayed in the display region is input, candidates for the insertion method of the second document file in inserting the second document file to the first document file are presented in accordance with the input instruction. The second document file is inserted to the first document file on the basis of the insertion method selected from the presented candidates.

According to a preferred aspect of the present invention, the document structure of the first document file is displayed as a tree, and an instruction for the insertion position of the second document file in the document structure is input.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 4A and 4B are tables showing a list of book attributes;

FIG. 5 is a table showing a list of chapter attributes;

FIG. 6 is a table showing a list of page attributes;

DETAILED DESCRIPTION OF THE PREFERRED EMBODIMENTS

Preferred embodiments of the present invention are described in detail in accordance with the accompanying drawings.

<System Outline>

The outline of a document processing system according to an embodiment of the present invention will be described with reference to FIGS. 1 to 12. This document processing system converts a data file created by a general application into an electronic document file by an electronic document writer. A bookbinding application provides a function of editing the electronic document file. Details of the system will be explained below.

<System Configuration and Operation>

Figure 1:
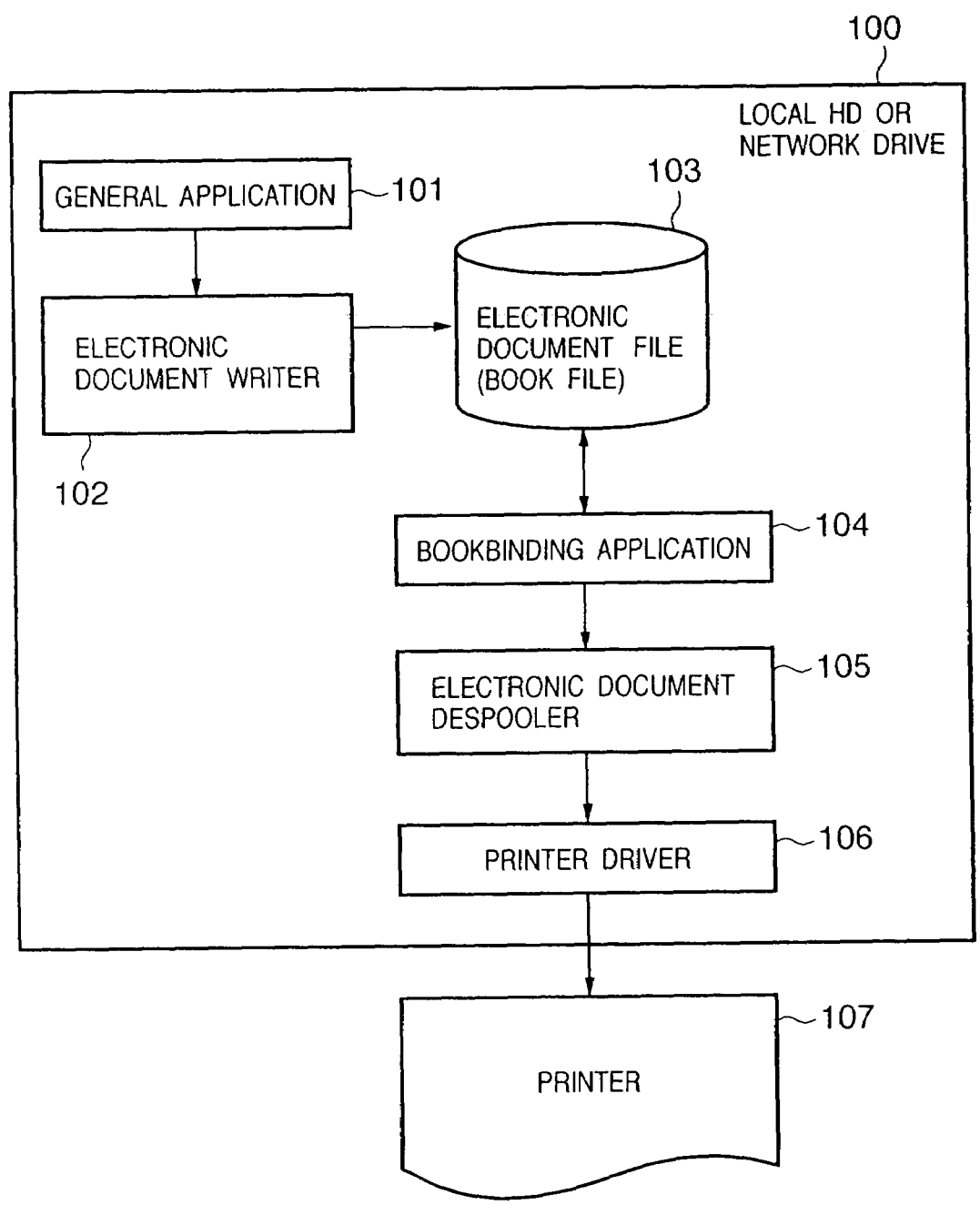
FIG. 1 is a block diagram showing the software configuration of a document processing system according to an embodiment.

FIG. 1 is a block diagram showing the software configuration of the document processing system according to the embodiment of the present invention.

The document processing system is implemented by a digital computer 100 as an embodiment suited to an information processing apparatus according to the embodiment. A general application 101 is an application program which provides functions such as wordprocessing, spreadsheet, photo-retouch, draw, paint, presentation, and text editing. The general application 101 has a printing function. Such application programs utilize a predetermined interface provided by the OS (Operating System) in printing application data such as created document data or image data. To print created data, the application 101 transmits an output command (GDI function) which is determined in advance for the output module (not shown) of the OS providing the interface and has an OS-dependent format. The output module which has received the output command converts the command into a format processible by an output device such as a printer, and outputs the converted command (DDI function). Since the format processible by the output device changes depending on the type of device, the manufacturer, and the model, a device driver is provided for each device. The OS converts a command by using the device driver to generate printing data, and combines printing data by JL (Job Language) to generate a print job. When the OS is Microsoft Windows®, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an electronic document file 103 by converting an output command into a format processible by a bookbinding application 104 or printer driver 106 (to be described later). The format (to be referred to as an "electronic document format" hereinafter) converted by the electronic document writer 102 is not particularly limited as far as each document page can be expressed by a detailed format. Of substantial standard formats, for example, the PDF format by Adobe Systems and the SVG format can be adopted as electronic document formats.

When the application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the bookbinding application 104, and executes conversion of application data into an electronic document file under the management of the bookbinding application 104.

The bookbinding application 104 completes a new incomplete electronic document file generated by the electronic document writer 102 as an electronic document file having the following format. In case of necessity to definitely discriminate these files, a file created by the electronic document writer 102 will be called an "electronic document file", and an electronic document file given a structure by the bookbinding application will be called a "book file". If these files need not be particularly discriminated, a document file generated by an application, an electronic document file, and a book file are called "document files (or document data)".

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as the electronic document file 103 in a storage medium such as a hard disk. The hard disk may be the local drive of the computer which implements the document processing system according to the embodiment, or when the computer is connected to a network, may be a drive provided on the network.

The bookbinding application 104 provides the user with a function of loading and editing the "electronic document file" or "book file" 103. The bookbinding application 104 provides no function of editing the contents of each page, but a function of editing a chapter or book structure (to be described later) made up of pages as a minimum unit. As will be described later, the bookbinding application 104 has a function of designating, for the book file 103, printing settings (printing method (double-sided/single-sided/bookbinding printing), printing layout (N-up/poster printing), color processing mode (color/monochrome), finishing setting (ON/OFF of stapling/saddle stitch/punching and the like), additional information setting (watermark, user name, date, background, and the like), chaptering, paper insertion (index sheet, tabbed sheet, front cover, and back cover), the number of copies, sorting designation, and the like).

To print the book file 103 edited by the bookbinding application 104, the bookbinding application 104 activates an electronic document despooler 105. The electronic document despooler 105 reads out a designated book file from the hard disk. To print each page in a format described in the book file, the electronic document despooler 105 generates an output command complying with the output module of the OS described above, and outputs the command to the output module (not shown). At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2A:
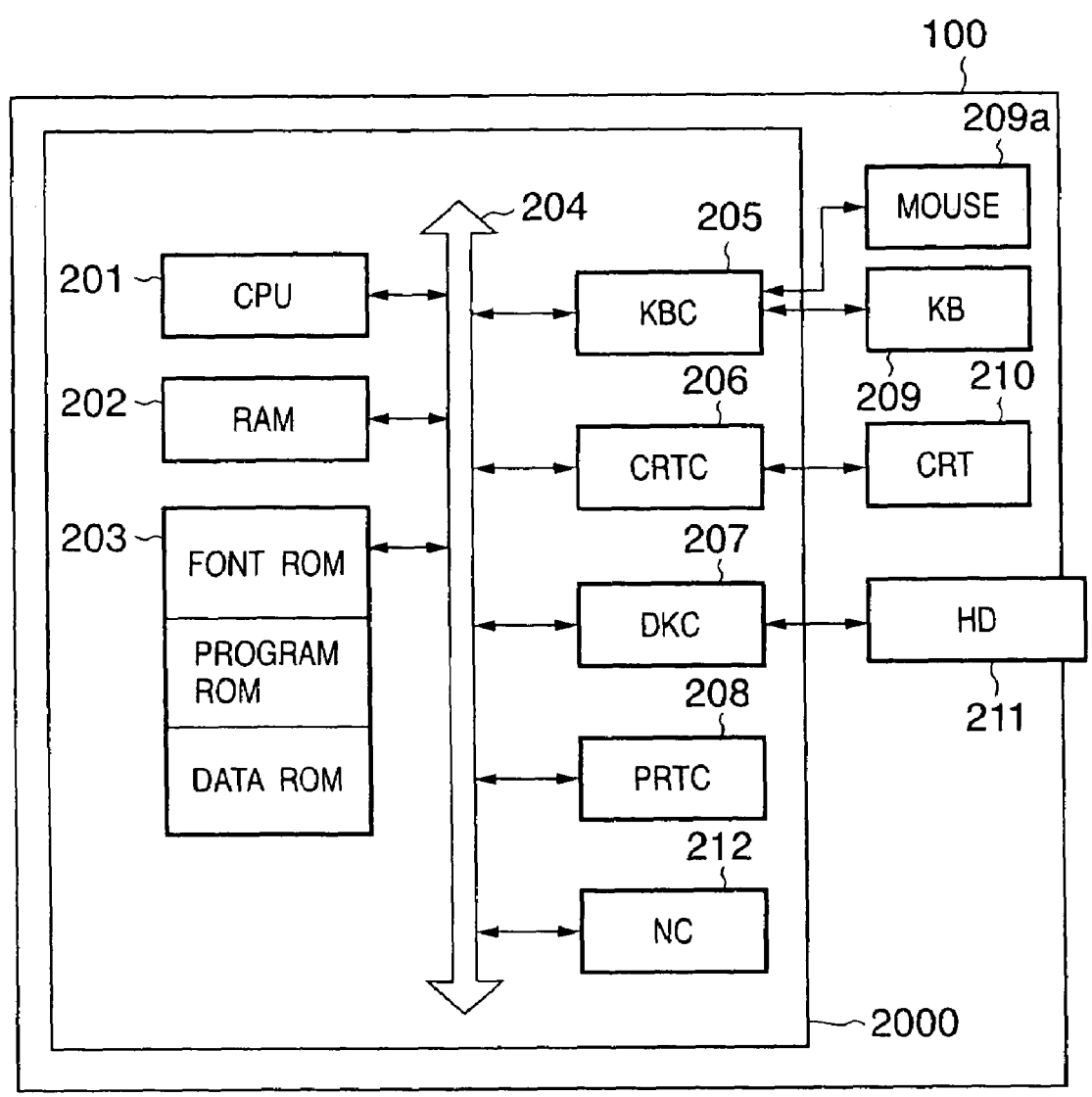
FIG. 2A is a block diagram showing an example of a hardware configuration which implements the document processing system according to the embodiment.

FIG. 2A is a block diagram showing the hardware configuration of the digital computer 100 shown in FIG. 1.

In FIG. 2A, a CPU 201 executes a program such as an OS, the general application 101, or the bookbinding application 104 which is stored in the program ROM of a ROM 203 or loaded from a hard disk 211 to a RAM 202, and realizes the software configuration in FIG. 1 or flow chart sequence (to be described later). The RAM 202 functions as the main memory or work area of the CPU 201. A keyboard controller (KBC) 205 controls a key input from a keyboard 209 or an input from a mouse 209a serving as a pointing device. A CRT controller (CRTC) 206 controls the display on a display 210. The display 210 is not limited to a CRT, and may be a liquid crystal display or plasma display. A disk controller (DKC) 207 controls access to the hard disk (HD) 211 or flexible disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

Figure 2B:
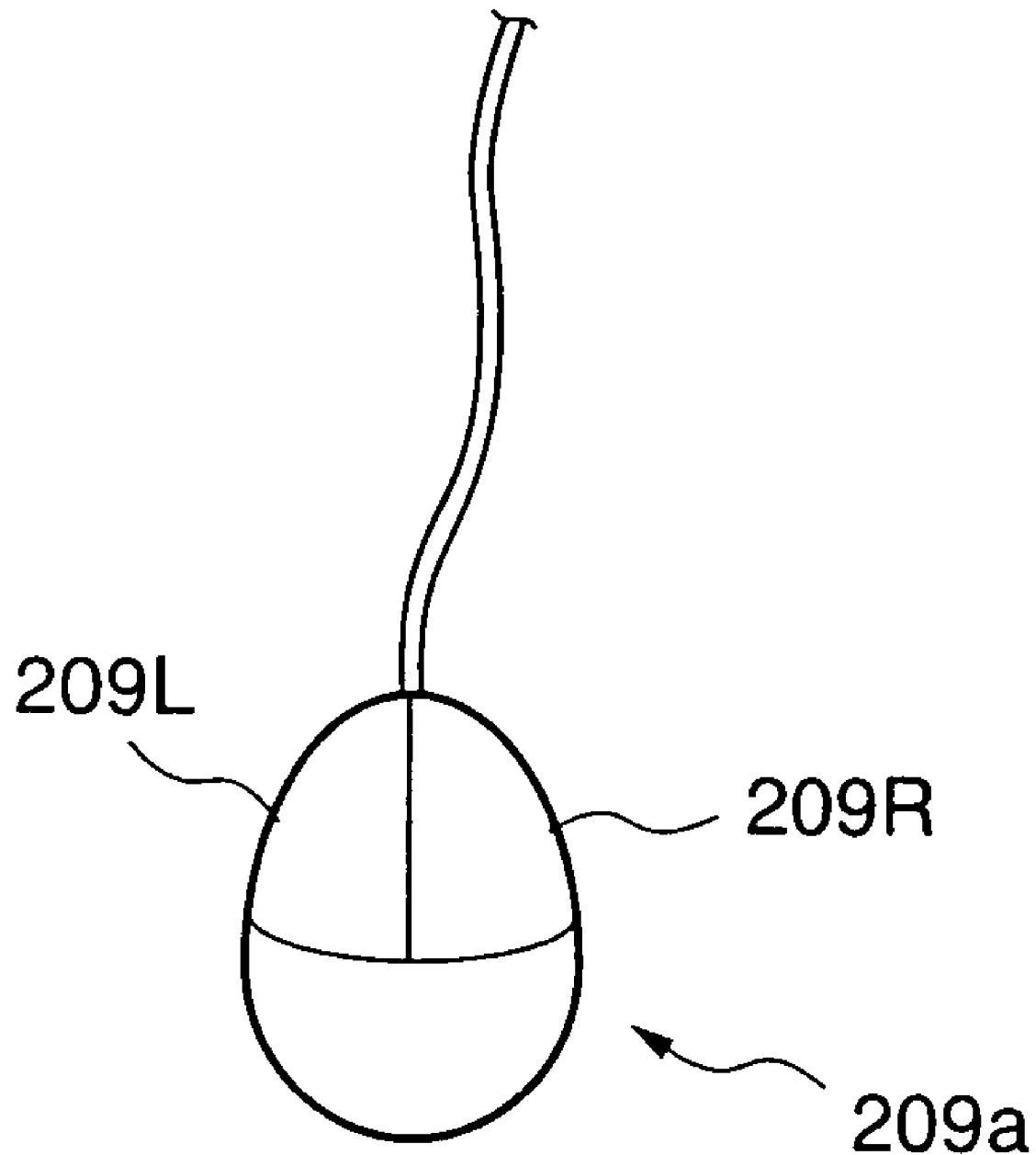
FIG. 2B is a view showing a structure example of a mouse according to the embodiment.

FIG. 2B is a view showing a structure example of the mouse 209a.

The mouse 209a in the embodiment is, e.g., a 2-button mouse. In FIG. 2B, reference numeral 209R denotes a right button; and 209L, a left button. In this specification, an operation of pressing either button once and releasing it within a short time will be called "click". The click of the right button 209R will be called "right click", and that of the left button 209L will be called "left click".

<Electronic Document Data Format>

Before a detailed description of the bookbinding application 104, the "book file" data format will be explained.

The book file has a three-layered structure similar to a paper-medium book. The upper layer is called a "book", resembles one book, and defines the attributes of the entire book. The intermediate layer corresponds to a chapter in the book, and is also called a "chapter". As for each "chapter", its attributes can be defined. The lower layer is a "page", and corresponds to each page defined by an application program. As for each "page", its attributes can be defined. One "book" may contain a plurality of "chapters", and one "chapter" may contain a plurality of "pages".

Figure 3A:
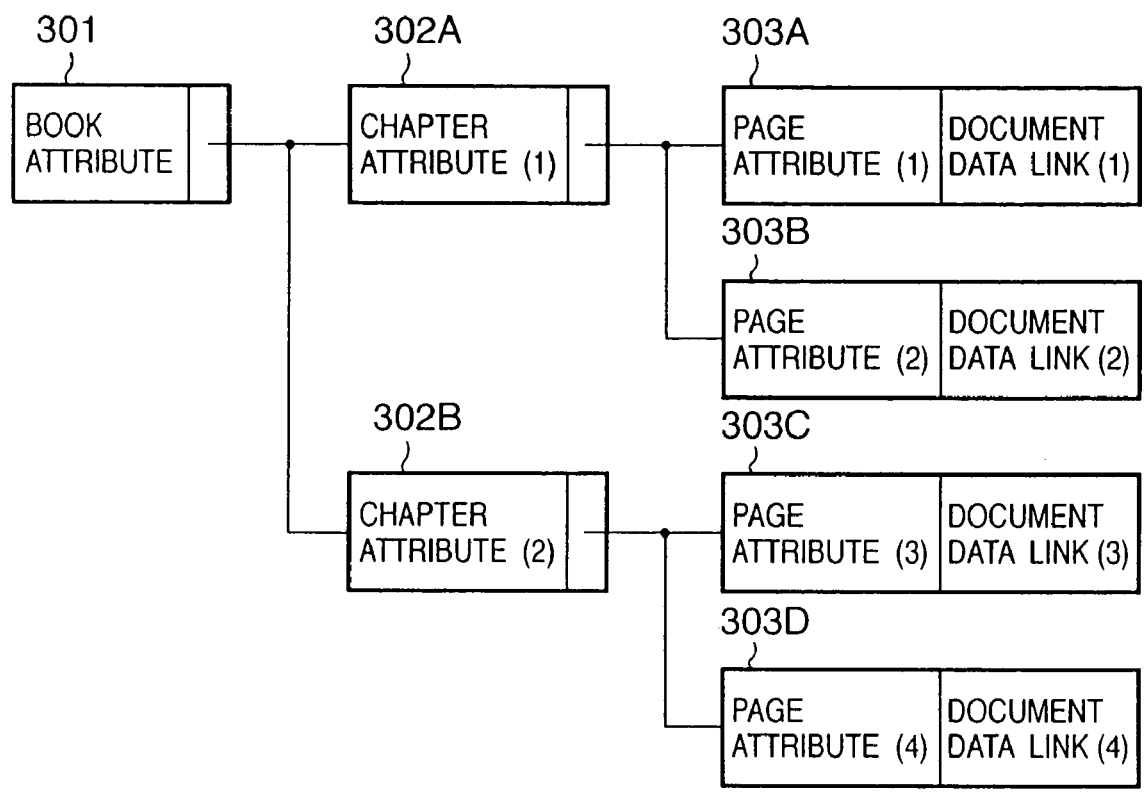
FIGS. 3A and 3B are views showing an example of a book file structure.

FIG. 3A is a block diagram schematically showing an example of the book file format. In the book file of this example, a "book", "chapter", and "page" are represented by corresponding nodes. One book file contains one "book". The "book" and "chapter" are a concept for defining a book structure, and contain, as entities, defined attribute values and links to lower layers. The "page" has, as an entity, data of each "page" output from an application program. In addition to an attribute value, the "page" contains the entity of a document page (document page data) and a link to each document page data. In some cases, a printing page to be output onto a paper medium or the like contains a plurality of document pages. This structure is displayed not by a link but by an attribute in the "book", "chapter", or "page" layer.

In FIG. 3A, a book 301 defines a book attribute, and is linked to two chapters 302A and 302B. These links display that the chapters 302A and 302B are contained in the book 301. The chapter 302A is linked to pages 303A and 303B, which represents that the chapter 302A contains these pages. The pages 303A and 303B define page attribute values, and contain links to document page data (1) and (2) serving as entities. These links represent document data (1) and (2) of document page data 304 shown in FIG. 3B, and display that the entities of the pages 303A and 303B are document page data (1) and (2).

Similarly, the chapter 302B contains pages 303C and 303D, and the pages 303C and 303D contain links to document page data (3) and (4) serving as entities. These links represent document data (3) and (4) of document page data 304 shown in FIG. 3B, and display that the entities of the pages 303C and 303D are document page data (3) and (4).

FIGS. 4A and 4B are tables for explaining the book attribute 301 according to the embodiment.

In FIGS. 4A and 4B, as for an item which can be defined repetitively in a lower layer, the attribute value of the lower layer is preferentially adopted. As for an item contained in only the book attribute 301, a value defined in the book attribute 301 is effective over the book. An item repetitively defined in a lower layer is a default value used when this item is not defined in the lower layer. Each item shown in FIGS. 4A and 4B do not correspond to one concrete item, but may contain a plurality of relevant items.

FIG. 5 is a table for explaining the chapter attribute according to the embodiment, and FIG. 6 is a table for explaining the page attribute according to the embodiment. The relationship between the chapter attribute and the page attribute is the same as that between the book attribute and the lower layer attribute.

In FIGS. 4A and 4B, items unique to the book attribute 301 are six items: "printing method", "details of bookbinding", "front/back cover", "index sheet", "slip sheet", and "chaptering". These items are defined over the book.

As "printing method" attributes, three values: "single-sided printing", "double-sided printing", and "bookbinding printing" can be designated. "Bookbinding printing" is a method of printing data in a format which allows bookbinding by bundling a separately designated number of paper sheets, folding the bundle into two, and binding the bundle. As "detailed bookbinding" attributes, the "opening direction" and the "number of paper sheets to be bundled" can be designated when the "printing method" designates "bookbinding printing".

The "front/back cover" attribute includes designation of adding paper sheets serving as front and back covers when an electronic document file combined as a book is printed, and designation of contents to be printed on the added paper sheets. The "index sheet" attribute includes designation of inserting a tabbed index sheet separately prepared in a printing apparatus for chaptering, and designation of contents to be printed on the index (tabbed) portion. This attribute becomes effective when a printing apparatus for use is equipped with an inserter having an inserting function of inserting a paper sheet prepared separately from a printing paper sheet into a desired position, or when a plurality of sheet cassettes can be used. This also applies to the "slip sheet" attribute. The "slip sheet" attribute includes designation of inserting a paper sheet fed from an inserter or sheet feed cassette for chaptering, and designation of a sheet feed source when a slip sheet is inserted.

The "chaptering" attribute includes designation of whether to use a new paper sheet, use a new printing page, or do nothing particular at a chapter break. In "single-sided printing", the use of a new paper sheet and the use of a new printing page are the same. In "double-sided printing", a continuous chapter is not printed on one paper sheet if "the use of a new paper sheet" is designated, but may be printed on the obverse and reverse of one paper sheet if "the use of a new printing page" is designated.

As for the chapter attribute shown in FIG. 5, there is no item unique to the chapter, and all items overlap those of the book attribute. If the definition of the chapter attribute is different from that of the book attribute, a value defined by the chapter attribute precedes. Items common to only the book and chapter attributes are five items: "paper size", "paper direction", "N-up printing designation", "enlargement/reduction", and "discharge method". The "N-up printing designation" attribute is an item for designating the number of document pages contained in one printing page. Layouts which can be designated are 1×1, 1×2, 2×2, 3×3, 4×4, and the like. The "discharge method" attribute is an item for designating whether to staple discharged paper sheets. The effectiveness of this attribute depends on whether the printing apparatus has a stapling function.

In the page attribute shown in FIG. 6, items unique to the page attribute are "page rotation designation", "zoom", "layout designation", "annotation", and "page division". The "page rotation designation" is an item for designating the rotation angle when a document page is laid out on a printing page. The "zoom" attribute is an item for designating the zoom ratio of a document page. The zoom ratio is designated based on a virtual logical page region size=100%. The virtual logical page region is a region occupied by one document page when document pages are laid out in accordance with N-up designation or the like. For example, the virtual logical page region is a region corresponding to one printing page for 1×1, and a region obtained by reducing each side of one printing page to about 70% for 1×2.

Attributes common to the above-described "book", "chapter", and "page" are a "watermark" attribute and "header/footer" attribute. The "watermark" is a separately designated image or character string printed over data created by an application. The "header and footer" are watermarks printed at the upper and lower margins of each page. For the "header and footer", items such as a page number, and time and date which can be designated by variables are prepared. Contents which can be designated by the "watermark" attribute and "header/footer" attribute are common to the "chapter" and "page", but are different in the "book". The "book" can set the contents of the "watermark" and "header/footer", and designate how to print a "watermark" or "header/footer" throughout the book. To the contrary, the "chapter" and "page" can designate whether to print a "watermark" or "header/footer" set by the book on the chapter or page.

<Book File Generation Sequence>

The "book file" serving as an electronic document file which is given a structure by the bookbinding application 104 has the above-described structure and contents. A sequence of creating a book file by the bookbinding application 104 and electronic document writer 102 will be explained. Creation of a book file is realized as part of book file editing operation by the bookbinding application 104.

Figure 7:
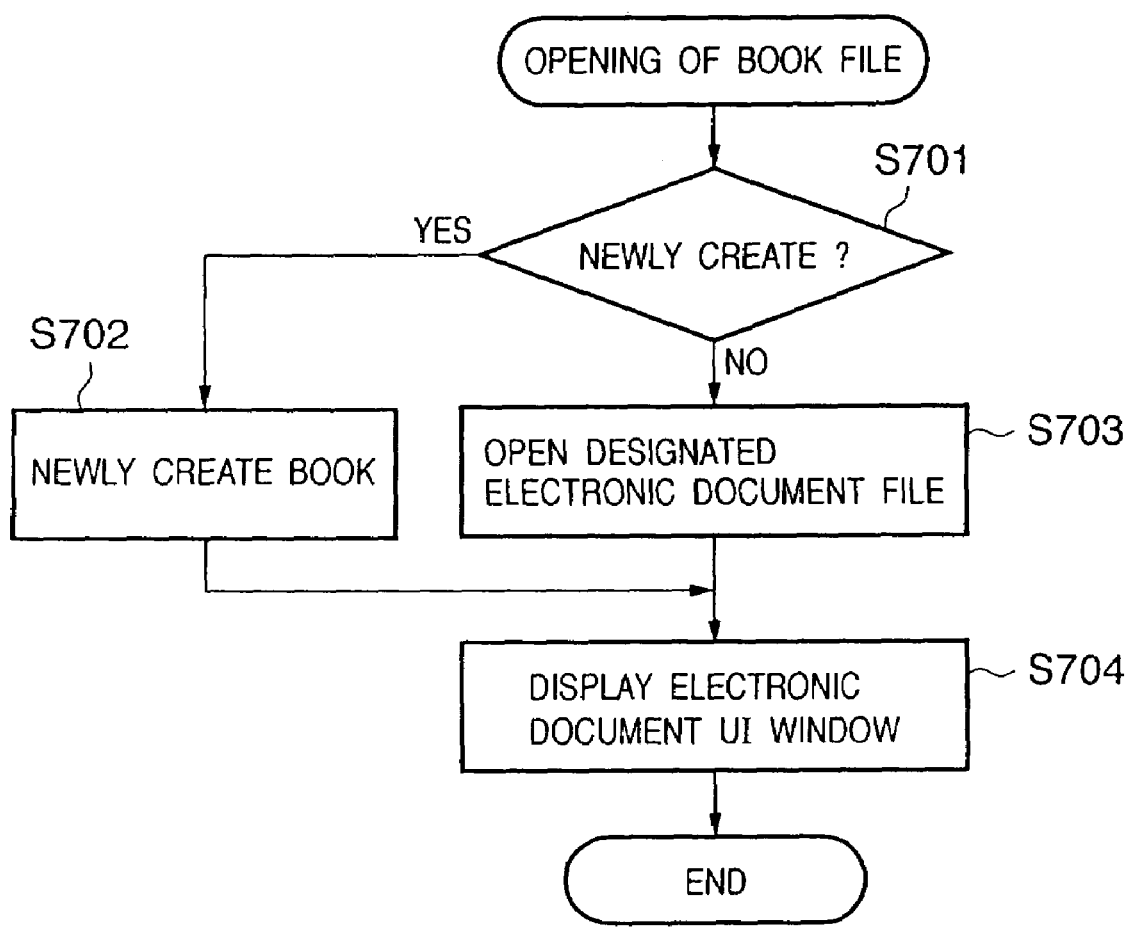
FIG. 7 is a flow chart showing an example of a sequence of opening a book file.

FIG. 7 is a flow chart for explaining a sequence of opening a book file by the bookbinding application 104 according to the embodiment.

In step S701, the bookbinding application 104 determines whether a book file to be opened is one to be newly created or an existing one. If YES in step S701, the processing advances to step S702, and the bookbinding application 104 newly creates a book file containing no chapter. In the example shown in FIG. 3, the newly created book file is a book node which has only the book node 301 without any link to a chapter node. As the book attribute, a set of attributes prepared in advance for creation of a new book file are applied. The processing advances to step S704, and the bookbinding application 104 displays a UI (User Interface) window for editing the new book file.

Figure 11:
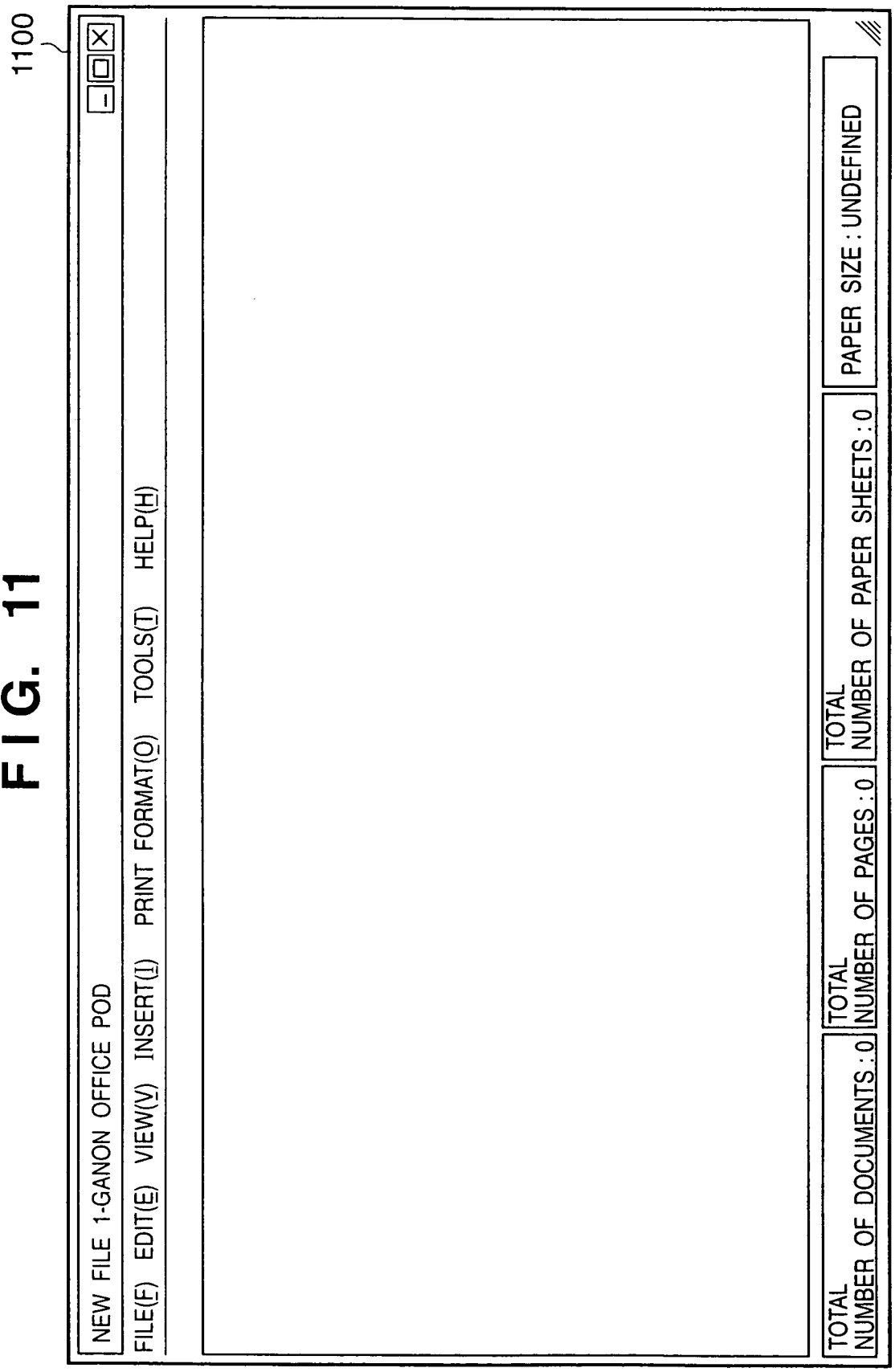
FIG. 11 is a view showing an example of a user interface window when a new book file is opened.

FIG. 11 shows an example of the UI window when a book file is newly created. In this case, a UI window 1100 does not display any information because the book file does not have any substantial content.

If NO in step S701, the processing advances to step S703, and the bookbinding application 104 opens a designated book file and displays a UI (User Interface) window in accordance with the structure, attribute, and contents of the book file.

Figure 10:
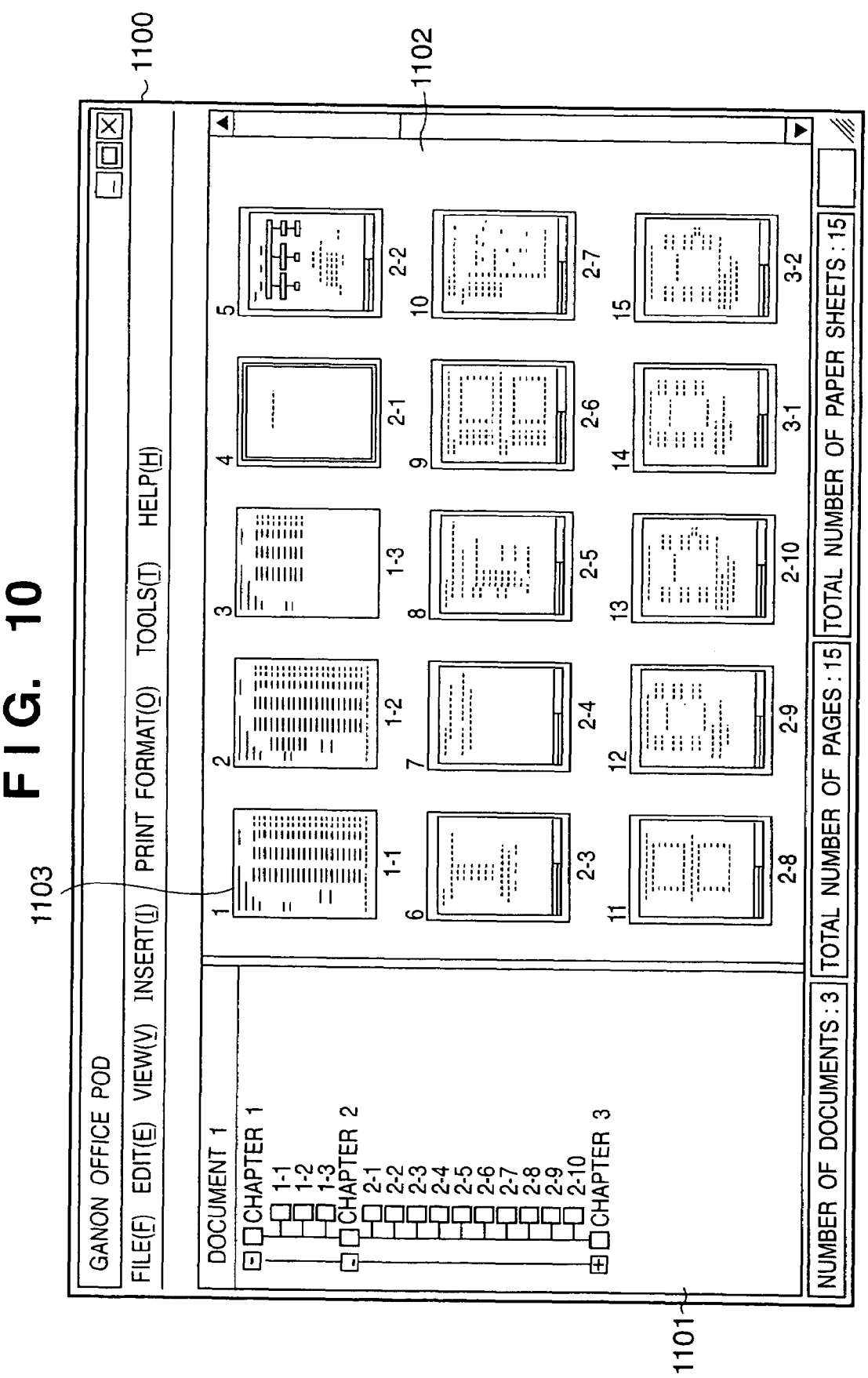
FIG. 10 is a view showing an example of a user interface window when an existing book file is opened.

FIG. 10 is a view showing an example of the displayed UI window.

The UI window 1100 has a tree portion 1101 representing a book structure, and a preview portion 1102 displaying a state to be printed. The tree portion 1101 displays (displays a tree) chapters contained in the book and pages contained in each chapter by a tree structure as shown in FIG. 3A. The tree portion 1101 displays page numbers, and the page numbers represent document page numbers. The preview portion 1102 displays reduced printing page contents. The display order reflects the book structure.

Application data converted into an electronic document file by the electronic document writer 102 can be added as a new chapter or page to the open book file (regardless of a new book file or existing book file). This function is called an "electronic document import function". An electronic document is imported to the book file newly created by the sequence shown in the flow chart of FIG. 7, thereby giving an entity to the book file. This function is activated by drag-and-drop operation of application data to the window of FIG. 10. Note that drag-and-drop operation is an operation of positioning a mouse pointer to an object (i.e., application data), moving the mouse while pressing the left button 209L of the mouse, and releasing the mouse button at a target position. The mouse in FIG. 2B is a right-handed mouse. For a left-handed mouse, drag-and-drop operation is an operation of moving (dragging) the mouse while pressing the right button 209R of the mouse and selecting an object, and releasing (dropping) the mouse button at a target position. By drag-and-drop operation, new application data can be added to a book file which has already been opened. In the bookbinding application, drag-and-drop operation adds a new chapter when the object is a document file, and a new page when the object is an image file.

Figure 8:
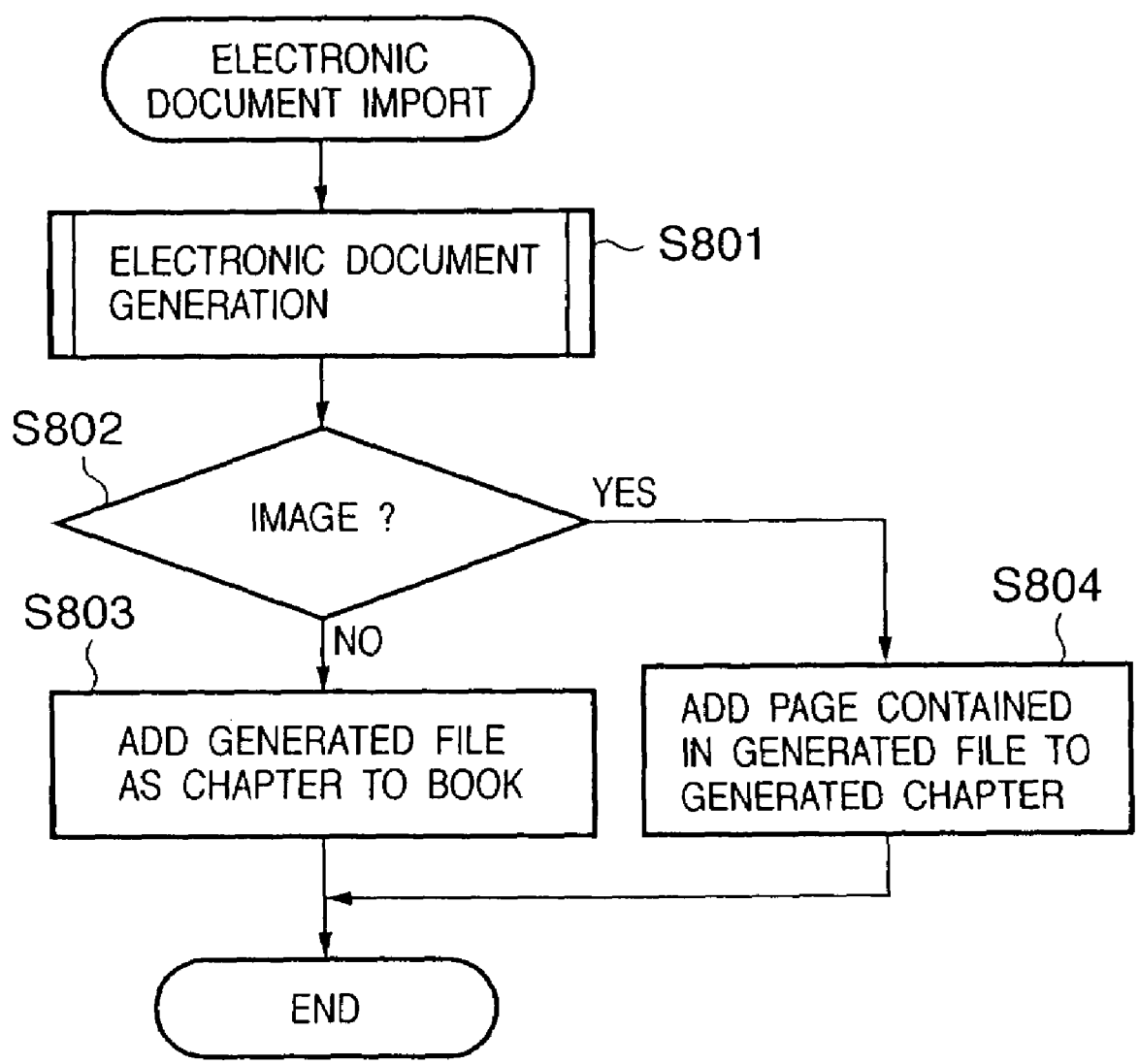
FIG. 8 is a flow chart showing an example of a sequence of importing an electronic document file to a book file.

FIG. 8 is a flow chart showing an electronic document import sequence according to the embodiment.

An application program which has generated designated application data is activated. The electronic document writer 102 is designated as a device driver, and prints out application data. The electronic document writer 102 generates electronic document data from the drawing function of application data input via the OS (step S801). After conversion into the electronic document data, the processing advances to step S802, and the bookbinding application 104 determines whether the converted data is image data. This determination can be achieved based on the file extension of application data under the Windows OS. For example, an extension "bmp" represents Windows bitmap data; "jpg", JPEG-compressed image data; and "tiff", TIFF-format image data. If YES in step S802, processing in step S801 can be skipped because an electronic document file can be directly generated from image data without activating an application in step S801.

If NO in step S802, the processing advances to step S803, and the bookbinding application 104 adds the electronic document file generated in step S801 as a new chapter to the book of a currently open book file. In this case, as for the chapter attribute, a book attribute value is copied for an attribute common to a book attribute, and a different attribute is set to a default value prepared in advance.

If YES in step S802, the processing advances to step S804, and the bookbinding application 104 adds each document page contained in the electronic document file generated in step S801 to a designated chapter without adding no new chapter in principle. For a file in which a book file is newly created, a new chapter is created, and each page of the electronic document file is added as a page belonging to the chapter. As for the page attribute, an attribute common to an upper layer attribute is given the attribute value of the upper layer attribute, and an attribute which is defined in application data and inherited to the electronic document file is given a value defined in the application data. For example, when "N-up printing designation" is defined in application data, the page inherits this attribute value. In this way, a new book file is created, or a new chapter is added.

Figure 9:
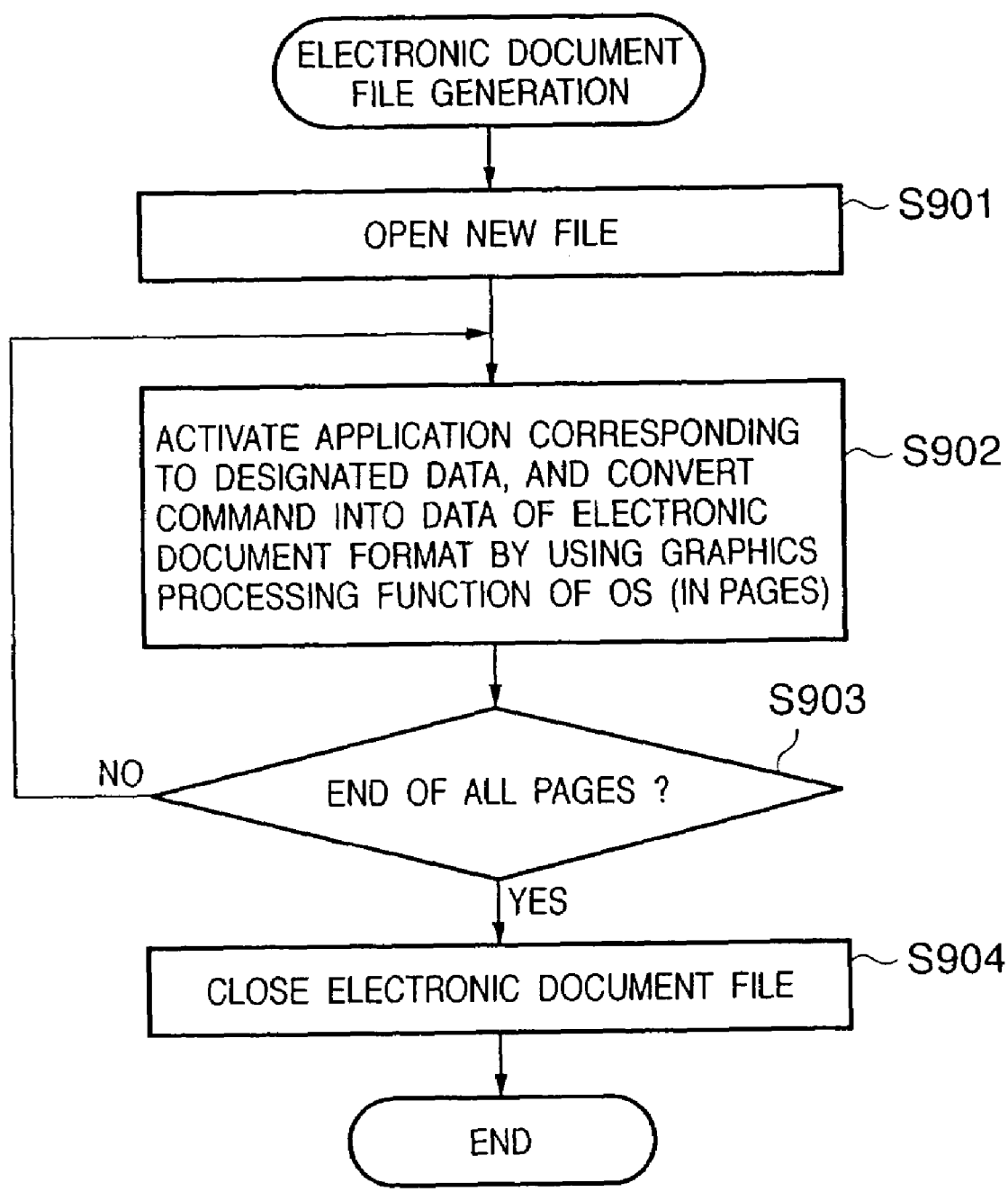
FIG. 9 is a flow chart showing an example of a sequence of generating an electronic document file.

FIG. 9 is a flow chart showing a sequence of generating an electronic document file by the electronic document writer 102 in step S801 of FIG. 8.

In step S901, a new electronic document file is created and opened. The processing advances to step S902, and an application corresponding to designated application data is activated. The electronic document writer 102 is set as a device driver to transmit an output command to the output module of the OS. The output module converts the received output command into data of the electronic document format by the electronic document writer, and outputs the converted data. The output destination is the electronic document file opened in step S901. The processing advances to step S903 to determine whether all designated data have been converted. If YES in step S903, the processing advances to step S904 to close the electronic document file.

Figure 3B:
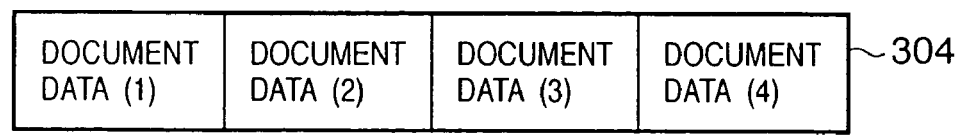

The electronic document file generated by the electronic document writer 102 is a file containing document page data entities shown in FIG. 3B.

<Editing of Book File>

As described above, a book file can be created from application data. The generated book file allows editing a chapter and page as follows.
(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each document page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of a document page, and insertion of a slip sheet and index sheet. By these operations, operation results are reflected in attributes shown in FIGS. 4A to 6 or on a book file structure. For example, a blank page is inserted to a designated portion by an operation of newly adding a blank page. The blank page is processed as a document page. If the layout of a document page is changed, the change contents are reflected in attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application shown in FIG. 10, and selects printing from this menu. The book file is then printed out from a designated output device. At this time, the bookbinding application 104 creates a job ticket from a currently open book file, and transfers the job ticket to the electronic document despooler 105. The electronic document despooler 105 converts the job ticket into an OS output command, e.g., a Windows GDI command, and transmits the command to an output module, e.g., GDI. The output module generates a command complying with an output device by a designated printer driver 106, and transmits the command to the output device.

The job ticket is data with a structure whose minimum unit is a document page. The data structure of the job ticket defines the layout of a document page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A sheet node to be printed on the paper belongs to each paper node. One sheet corresponds to one printing paper sheet. A printing page (physical page) belongs to each sheet. One physical page belongs to one sheet for single-sided printing, and two physical pages belong to one sheet for double-sided printing. A document page to be laid out on a physical page belongs to the physical page. The physical page attribute contains a document page layout.

The electronic document despooler 105 converts the job ticket into an output command to the output module.

<Another System Configuration>

The outline of the document processing system according to the embodiment has been described. This system is of a stand-alone type. A server-client system as an extension of the stand-alone system also creates and edits a book file by almost the same arrangement and sequence. A book file and printing processing are managed by the server.

Figure 12:
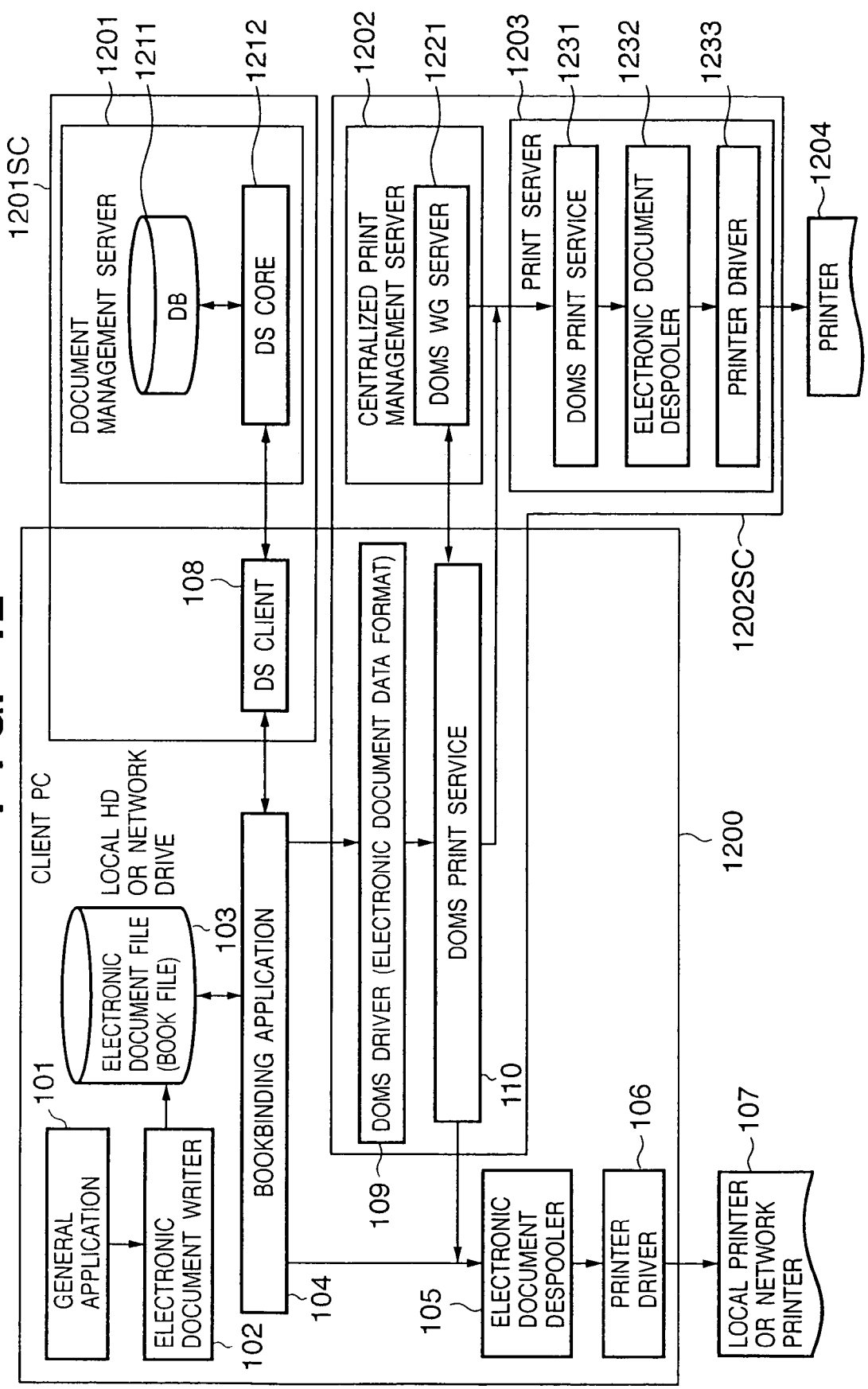
FIG. 12 is a block diagram showing an example of the software configuration of a client-server document processing system.

FIG. 12 is a block diagram showing the configuration of a server-client document processing system according to the embodiment.

A client document processing system 1200 is constituted by adding to the stand-alone system a DOMS (Document Output Management Service) driver 109 serving as a client module, a DOMS print service module 110, and a DS (Document Service) client module 108. The client document processing system 1200 is connected to a document management server 1201, centralized printing management server 1202, and print server 1203. These servers are generally connected to the client document processing system 1200 via a network. When the servers also function as clients, they are connected by interprocess communication which simulates communication between networks.

The document management server 1201 and centralized printing management server 1202 are connected to the client in FIG. 12, but only either one may exist on the network. If the connected server is the document management server, a document management server-client system 1201SC including a client module is added to the stand-alone document management system. If the connected server is the centralized printing management server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized printing management server 1202 manages printing of a book file stored in the client document processing system 1200 or document management server 1201. A printing request from the client is transmitted to a DOMS WG server module 1221 of the centralized printing management server 1202 via the DOMS driver 109 and DOMS print service module 110. To print a book file by the printer 107 of the client, the centralized printing management server 1202 transfers electronic document data to the electronic document despooler 105 via the DOMS print service module 110 of the client.

To print a book file by the print server 1203, the centralized printing management server 1202 transmits electronic document data to a DOMS print service module 1231 of the print server 1203. For example, the centralized printing management server 1202 executes security check on the qualification of a user who has issued a printing request for a saved book file, or saves the printing processing log. In this fashion, the document processing system can be implemented as both a stand-alone system and client-server system.

<Preview Display Contents>

As described above, when a book file is opened by the bookbinding application, the user interface window 1100 shown in FIG. 10 is displayed. The tree portion 1101 displays a tree representing the structure of the open book (to be referred to as a "book of interest" hereinafter). At the printing preview portion 1102, three display methods are prepared in accordance with designation by the user.

The first method is a "document view mode" in which document pages are directly displayed. In the "document view mode", the contents of document pages belonging to the book of interest are reduced and displayed. The display of the preview portion 1102 does not reflect any document layout.

The second method is a "printing view mode". In the "printing view mode", the preview portion 1102 displays document pages in a format which reflects the layout of them.

The third method is a "simple printing view mode". In the "simple printing view mode", the contents of document pages are not reflected in the display of the preview portion 1102, but only the layout is reflected.

<Insertion of File by Drag-and-drop>

A file insertion method by drag-and-drop according to the embodiment will be explained.

When a data file created by the general application is inserted by drag-and-drop to the tree portion 1101 of the user interface window 1100, an electronic document file 103 is created by the electronic document writer 102 and added to an existing book file.

Figure 13:
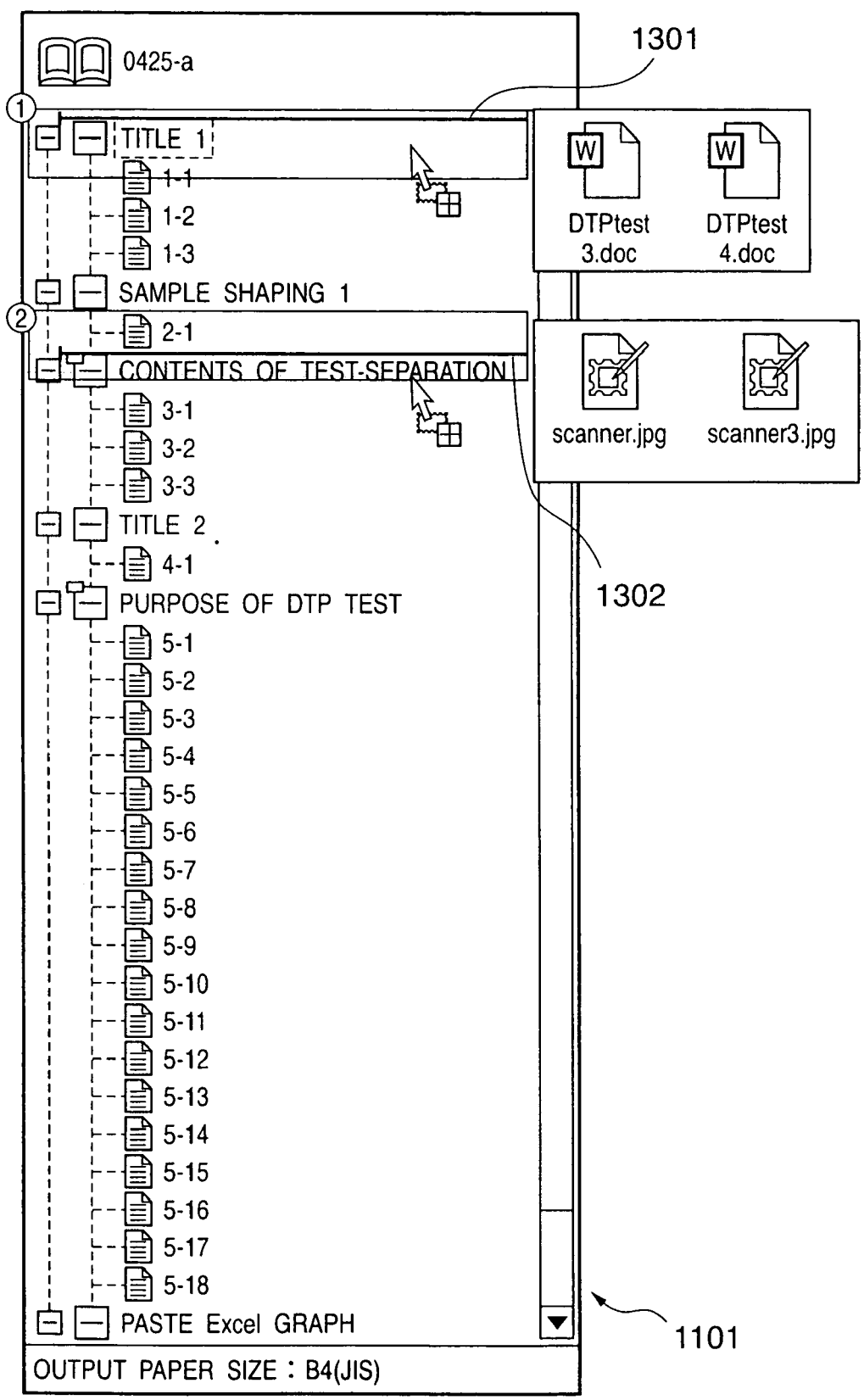
FIG. 13 is a view for explaining a conventional file insertion method.

At this time, in the above-described system, target files (DTPtest3.doc and DTPtest4.doc) are selected by a left click of the right-handed mouse, and inserted by designating a position desired by the user at the tree portion 1101 by drag-and-drop, as shown in the example of FIG. 13.

Whether to insert one or a plurality of files as chapters or pages is automatically determined by the bookbinding application 104 on the basis of whether the target file is general application data or an image file. To reset the chapter structure to one desired by the user after inserting data to the tree portion 1101, the user must perform corresponding operation. This operation is cumbersome especially when data to be inserted is a file formed by a plurality of pages or a plurality of files are inserted at once.

To prevent this, an object is inserted by the following operation in the embodiment. Note that the following mouse operation is based on a right-handed mouse.

(Insertion of File by Left Click)

Figure 14:
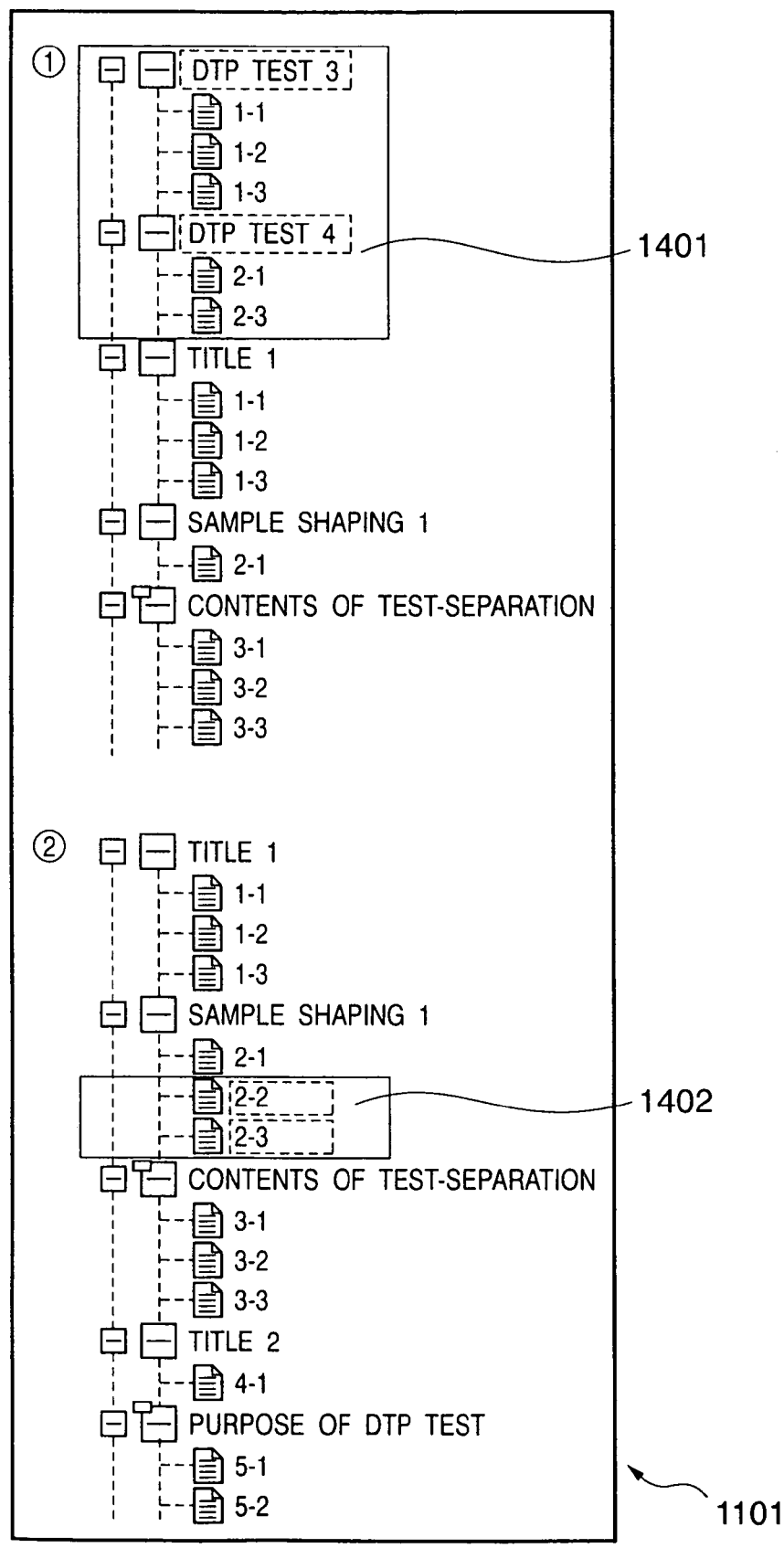
FIG. 14 is a view showing an example of a file insertion result according to the embodiment.

FIG. 14 is a view showing an example of inserting a file to the existing electronic document file 103 by drag-and-drop using a left click.

In this case, when files (DTPtest3.doc and DTPtest4.doc) are dropped to a branch 1301 representing the chapter name in FIG. 13 ("title 1" in the example of FIG. 13), these files are inserted as preceding chapters before the chapter "title 1", as represented by 1401 in FIG. 14. When files (scanner.jpg and scanner3.jpg) are dropped to a page in FIG. 13 ("2-1" page in the example of FIG. 13), these files are inserted as pages subsequent to the page "2-1", as represented by 1402 in FIG. 14. File insertion by drag-and-drop using a left click is performed in accordance with document structure information of a drop position (i.e., an insertion position) with default settings determined in advance by the bookbinding application 104, as described above. In the embodiment, the document structure of a document file is formed by at least a chapter in an upper layer and a page in the lower layer.

(Insertion of File by Right Click)

Figure 15:
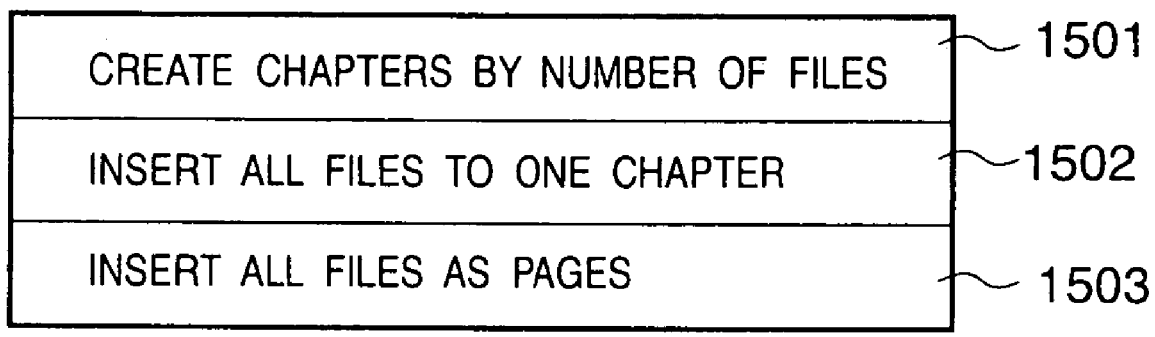
FIG. 15 is a view showing a display example of document structure type candidates according to the embodiment.

When a plurality of files are dragged and dropped by using a right click, the bookbinding application 104 determines the type of drag-and-drop (right or left click). If the bookbinding application 104 determines drag-and-drop using a right click, the application 104 displays, in a menu dialog, document structure type candidates for a file to be inserted, as shown in FIG. 15. For example, the document structure type includes "create chapters by the number of files" (1501), "insert all files to one chapter" (1502), and "insert all files as pages" (1503). Any one type can be selected from these candidates by using the mouse or keyboard. The bookbinding application 104 displays an item selected by the user in an inverted color. The example of FIG. 15 illustrates a dialog displayed when drag-and-drop operation using a right click is performed while a plurality of files are selected. When drag-and-drop operation using a right click is performed while a single file is selected, a menu dialog for selecting either "insert all files to one chapter" or "insert all files as pages" is displayed. That is, if drag-and-drop operation is done, the bookbinding application 104 determines whether this operation is drag-and-drop using a right click or drag-and-drop using a left click, and if determining that the operation is drag-and-drop using a right click, determines whether the operation is drag-and-drop of a plurality of files or drag-and-drop of a single file. If the bookbinding application 104 determines that the operation is drag-and-drop by a right click that selects a plurality of files, the application 104 displays the menu dialog shown in FIG. 15. If the bookbinding application 104 determines that the operation is drag-and-drop by a right click that selects a single file, the application 104 displays a menu dialog for selecting either "insert all files to one chapter" or "insert all files as pages". The display of the menu dialog changes in accordance with the drop position, which will be described later.

In inserting a plurality of files, if "create chapters by the number of files" (1501) is selected as the first document structure type, the bookbinding application 104 newly generates, from the insertion position, chapters corresponding to the number of files to be inserted, and the pages of each file are arranged in a corresponding generated chapter. If "insert all files to one chapter" (1502) is selected as the second document structure type, the bookbinding application 104 newly generates one chapter at the insertion position, and the pages of files to be inserted are arranged in the chapter. If "insert all files as pages" (1503) is selected as the third document structure type, the bookbinding application 104 directly arranges pages at the insertion position.

(Insertion of Single File by Right Click)

Figure 16:
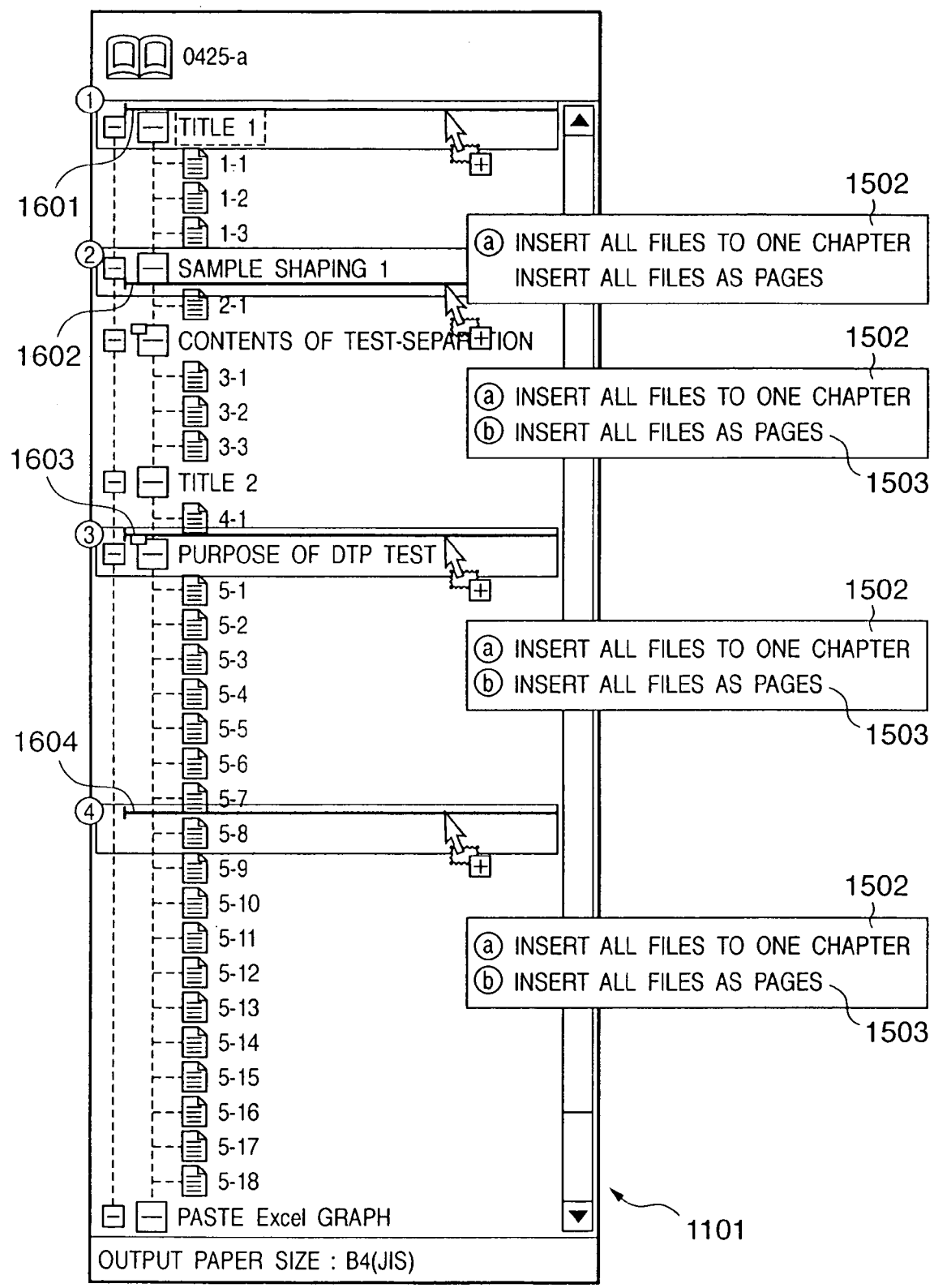
FIG. 16 is a view showing a menu display example for each drop position when a single file is dropped to the tree portion by drag-and-drop using a right click.

FIG. 16 is a view showing a menu display example at each drop position when a single file is dropped to the tree portion 1101 by drag-and-drop using a right click.

As shown in FIG. 16, when a single file is dropped to the tree portion 1101 by a right click, a menu corresponding to the drop position is displayed on the basis of the menu shown in FIG. 15.

More specifically, the bookbinding application 104 controls to change selectable items in accordance with the drop position and display the menu dialog. In the embodiment, all menus which cannot be selected depending on the drop position are grayed out. In this case, the number of files to be inserted is one, and "create chapters by the number of files" 1501 is grayed out so as not to select it. When a file is to be inserted before the first chapter, as represented by 1601 in FIG. 16, "insert all files as pages" 1503 is grayed out so as not to select it.

In short, the embodiment presents document structure type candidates corresponding to at least either the file insertion position or the number of selected document files.

An insertion method when a single file is dropped to each of positions 1601, 1602, 1603, and 1604 will be explained.

Figure 17:
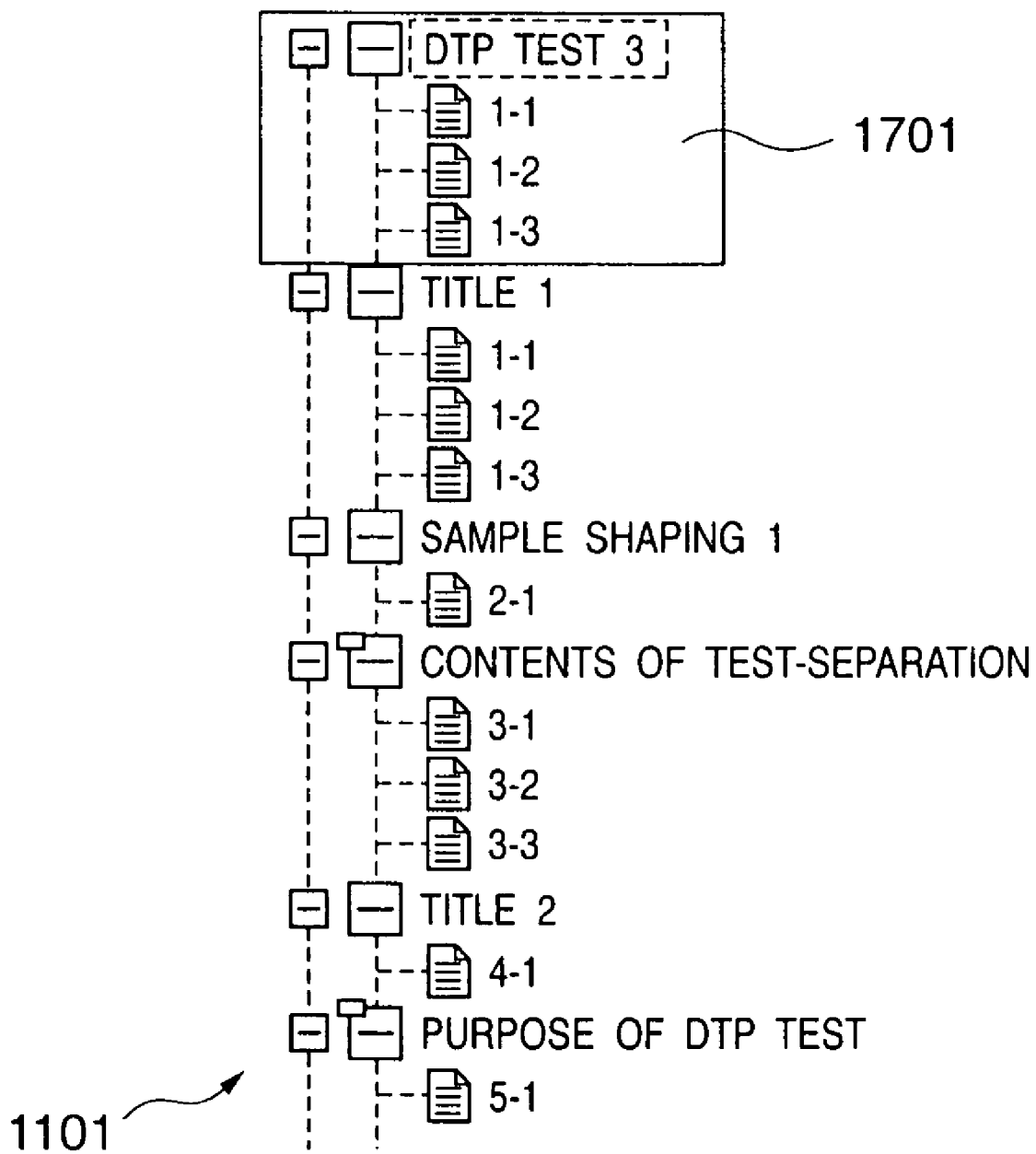
FIGS. 17, 18A, 18B, 19A, 19B, 20A, and 20B are views showing examples of a result of inserting a single file by drag-and-drop using a right click.

A case wherein one file is inserted to the position 1601 by a right click will be described. In this case, a single file is dragged and dropped immediately before the first chapter ("title 1"), and only "insert all files to one chapter" (1502) can be selected from the displayed menu. If the item 1502 is selected, a chapter is newly created at the top of the tree portion, and the pages of a new file are inserted to the newly created chapter, as represented by 1701 in FIG. 17.

When a file is inserted to the position 1602, 1603, or 1604, the two items "insert all files to one chapter" (1502) and "insert all files as pages" (1503) can be selected from the menu.

Figure 18A:
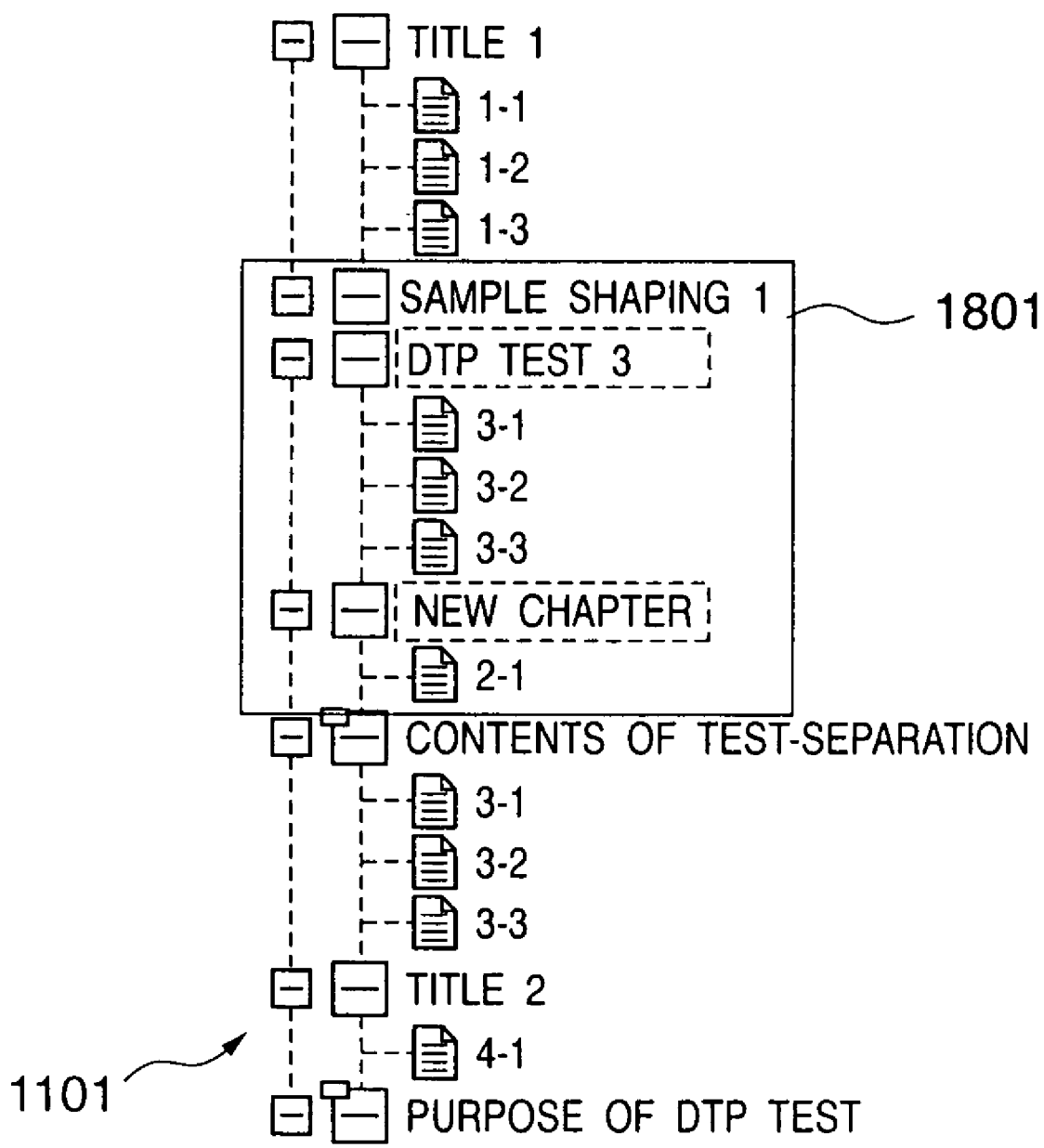
Figure 18B:
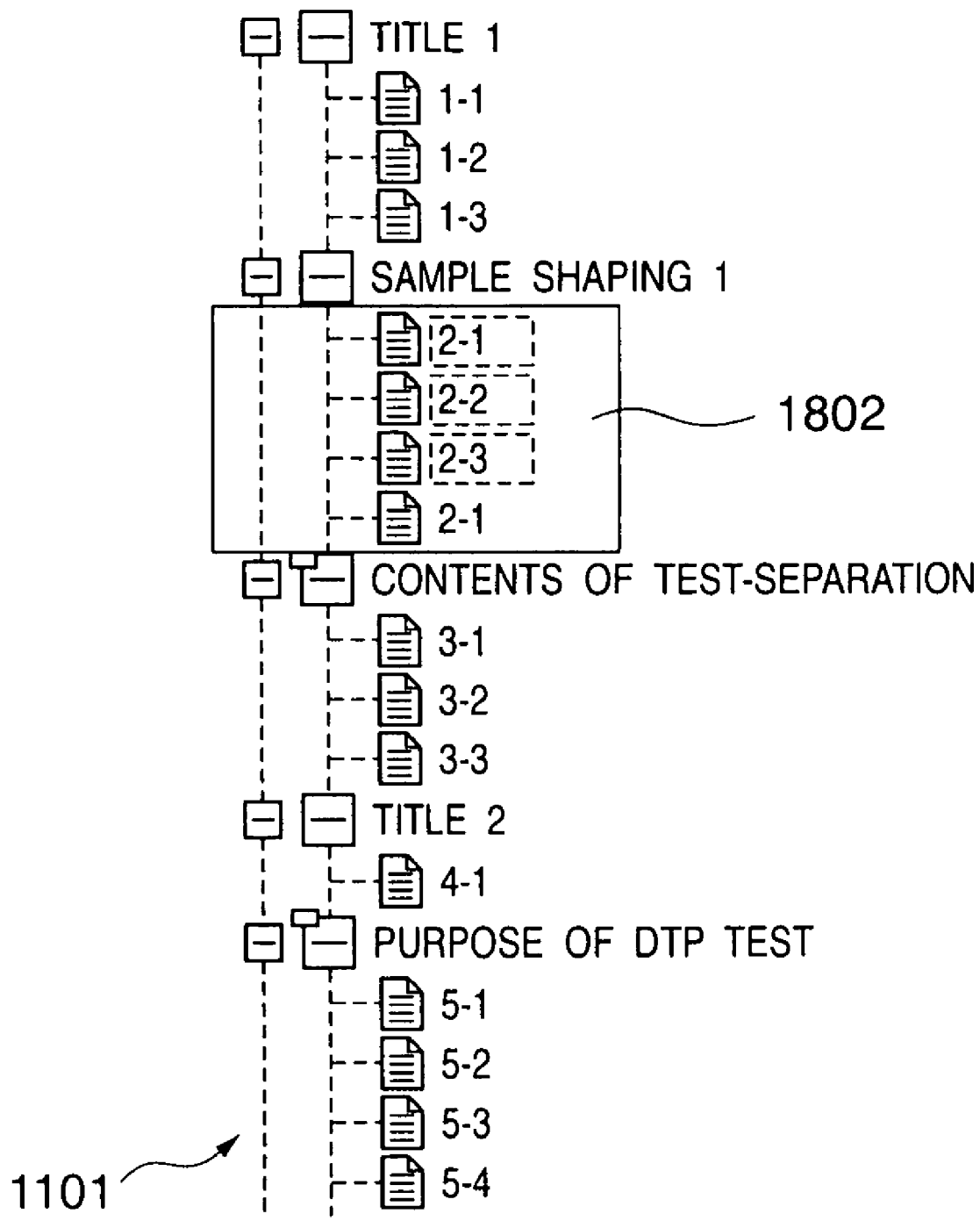

If "insert all files to one chapter" (1502) is selected from the menu upon dropping a file to the position 1602 between a chapter name ("sample shaping 1") and the first page (2-1), the dropped file (DTP test 3) is inserted as a new chapter by the bookbinding application 104 immediately before the first page (2-1) of the dropping destination chapter (sample shaping 1), as represented by 1801 in FIG. 18A. The document page (2-1) in the dropping destination chapter is moved as a "new chapter" after the inserted chapter. That is, the existing chapter (in this case, "sample shaping 1") is separated. If a file is dropped to the position 1602 and "insert all files as pages" (1503) is selected from the menu, the file is inserted as pages by the bookbinding application 104 from the start of the existing chapter to which the file has been dropped, as represented by 1802 in FIG. 18B.

Figure 19A:
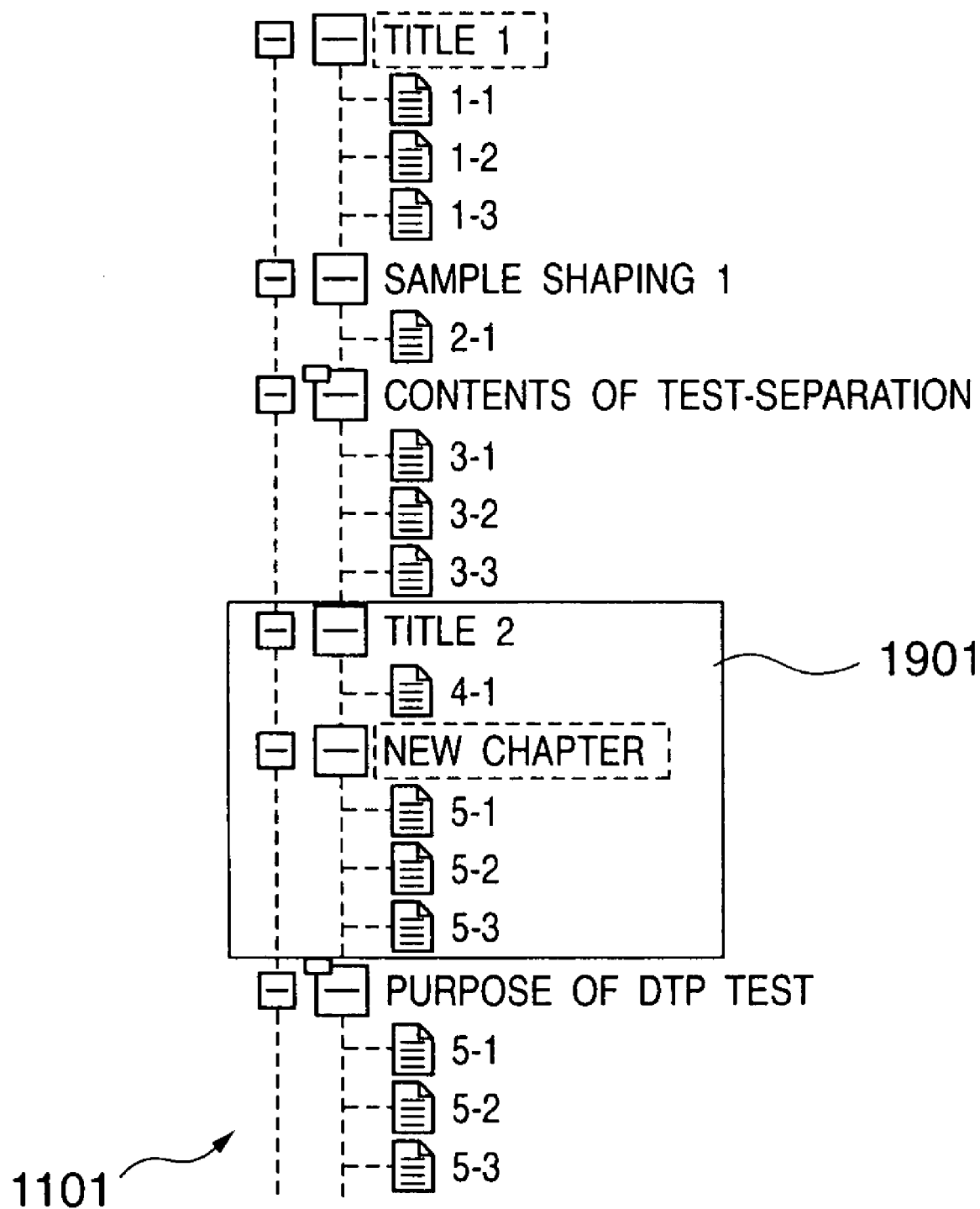
Figure 19B:
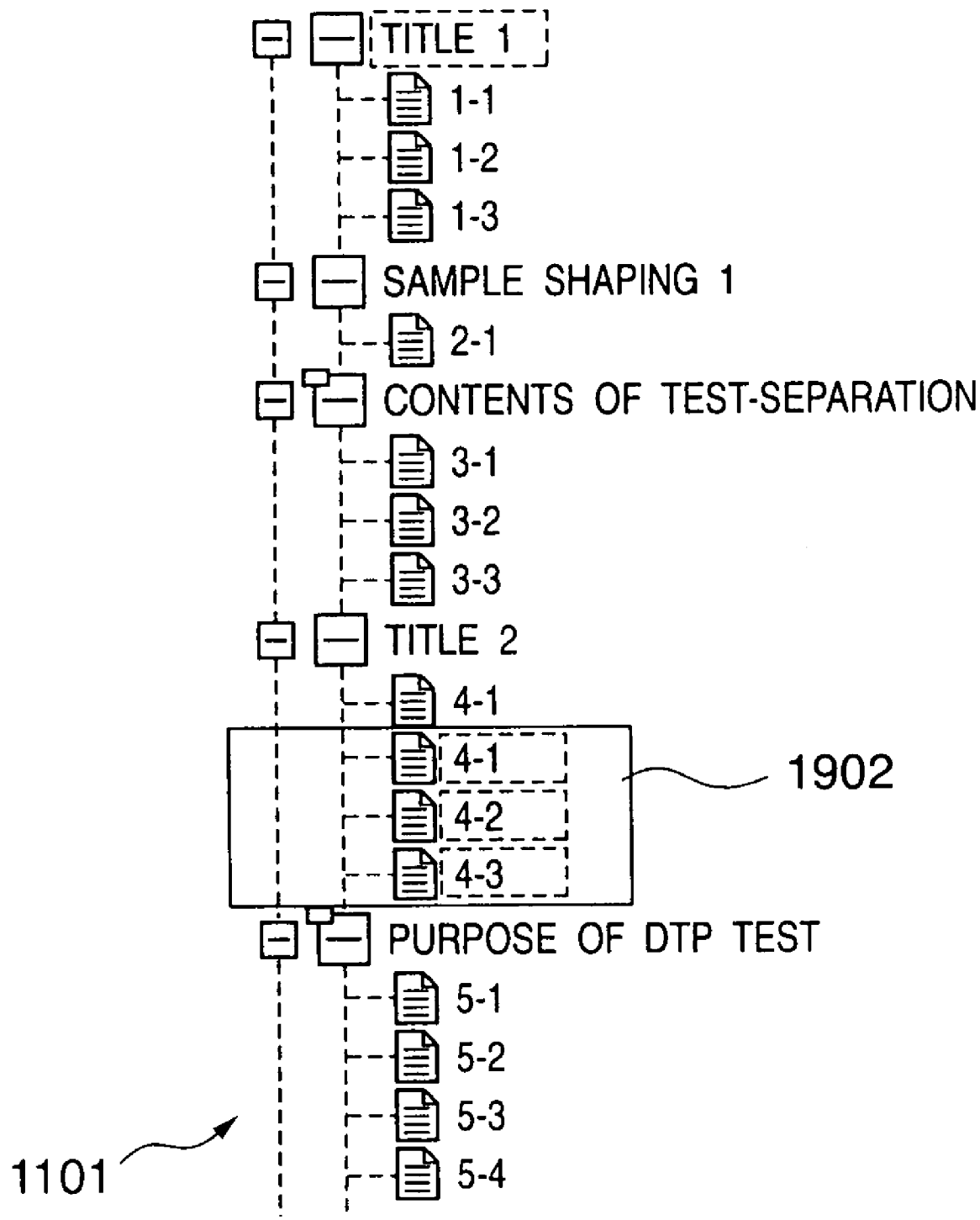

A case wherein a file is dropped to the position 1603 between a chapter name ("purpose of DTP test") and the final page (4-1) of the immediately preceding chapter ("title 2") will be explained. At this time, if "insert all files to one chapter" (1502) is selected from the displayed menu, a new chapter is created at the drop position by the bookbinding application 104, and pages are arranged in this chapter, as represented by 1901 in FIG. 19A. If a file is dropped to the position 1603 and "insert all files as pages" (1503) is selected from the menu, the file is directly inserted as pages to the drop position in the existing chapter by the bookbinding application 104, as represented by 1902 in FIG. 19B.

Figure 20A:
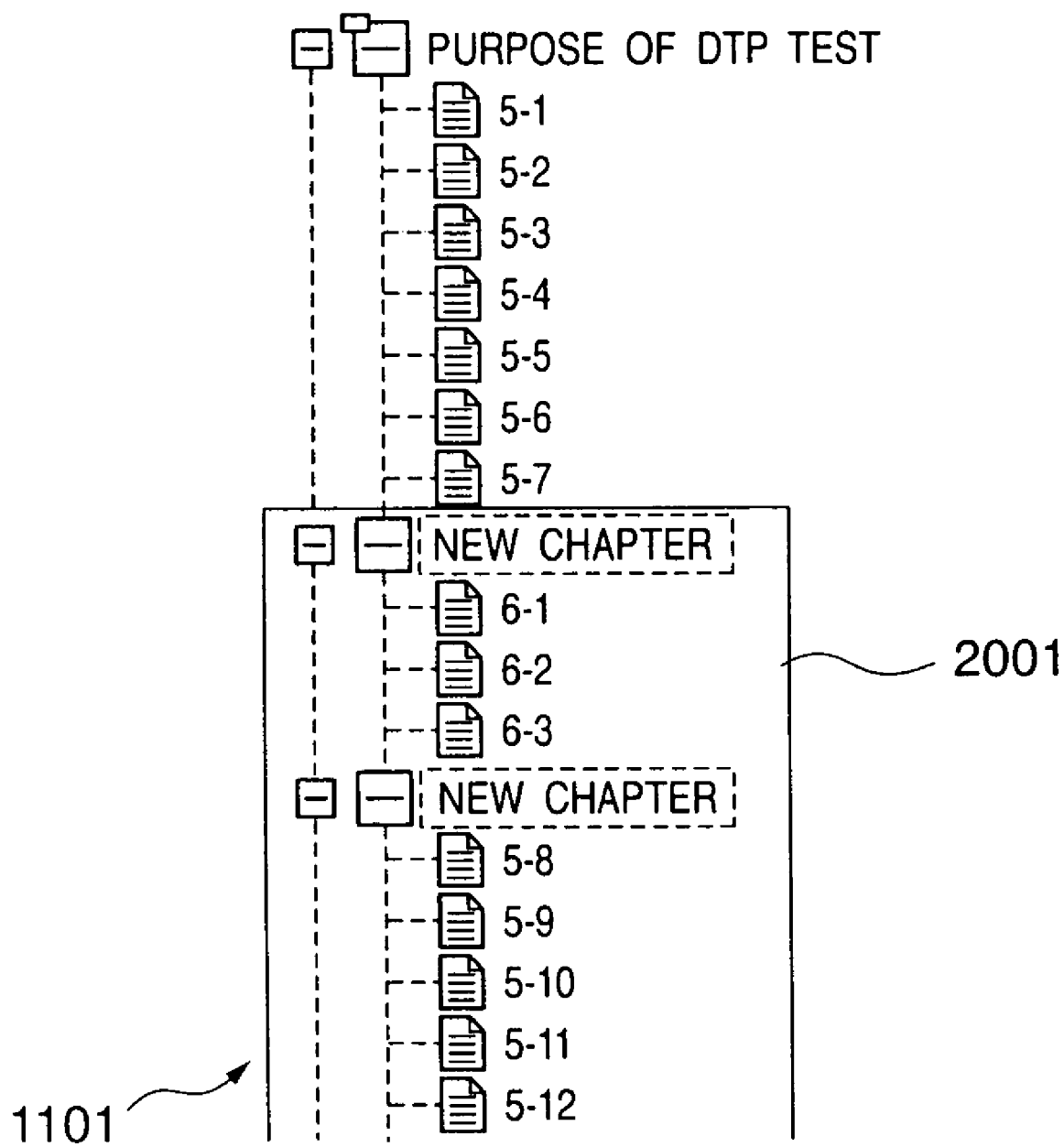
Figure 20B:
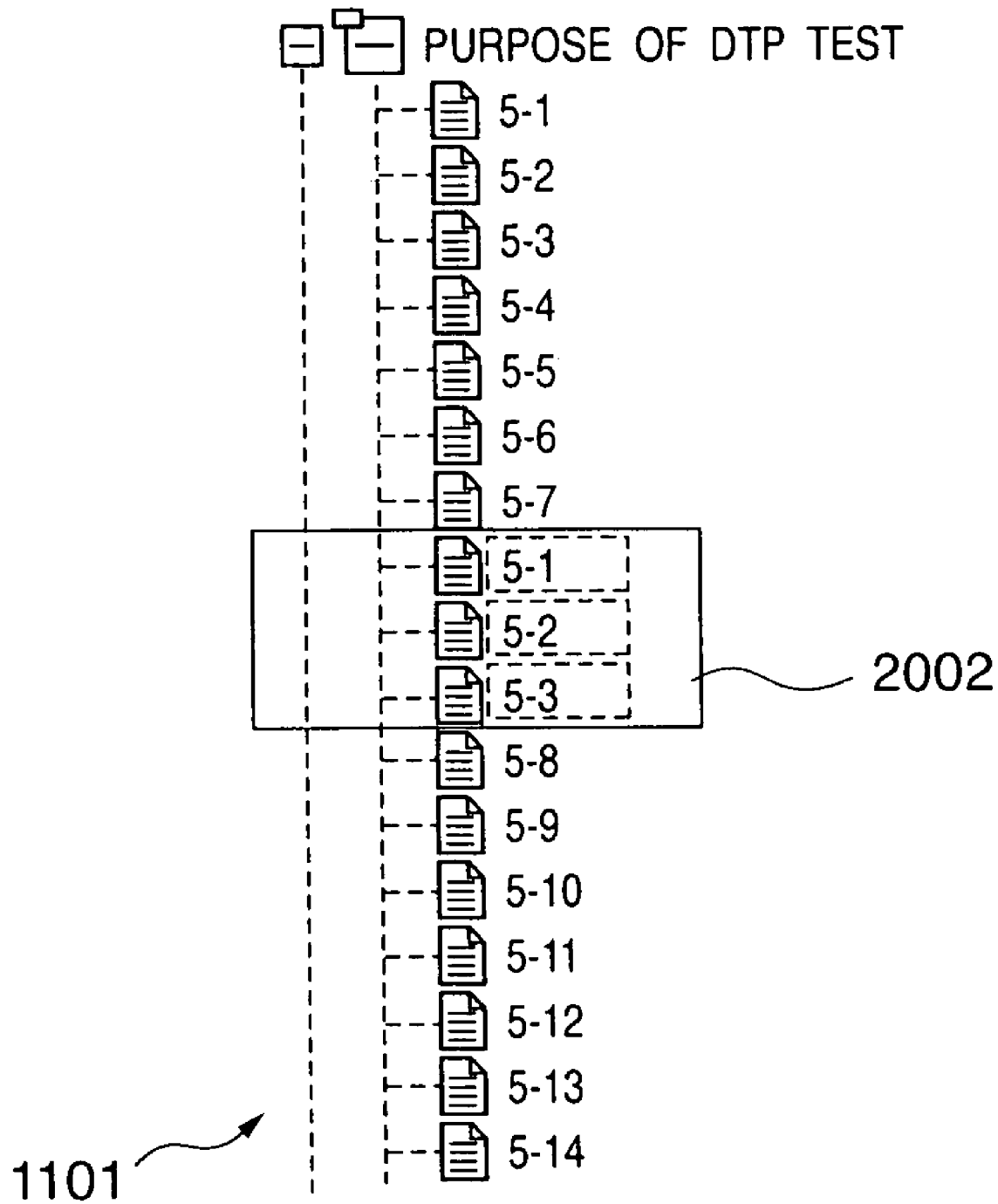

If a file is dropped to the position 1604 between pages (5-7 and 5-8) in the chapter name ("purpose of DTP test") and "insert all files to one chapter" (1502) is selected from the displayed menu, a new chapter is created at the drop position by the bookbinding application 104, pages are arranged in this chapter, and pages after the drop position are so rearranged as to belong to another new chapter, as represented by 2001 in FIG. 20A. If a file is dropped to the position 1604 and "insert all files as pages" (1503) is selected from the menu, the file is directly inserted as pages to the drop position in the existing chapter by the bookbinding application 104, as represented by 2002 in FIG. 20B.

(Insertion of Plurality of Files by Right Click)

Insertion of a plurality of files by using a right click will be described.

Figure 21:
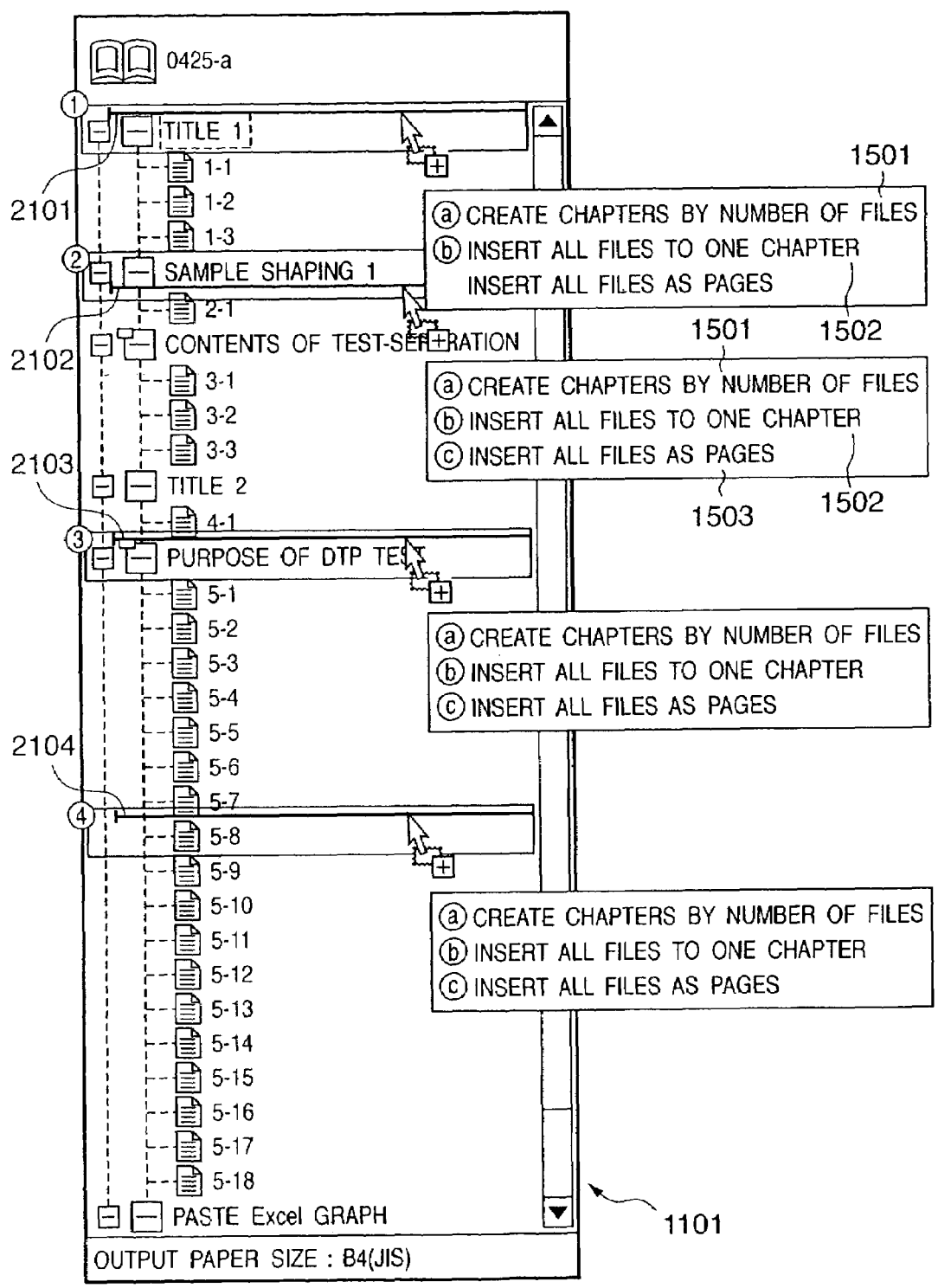
FIG. 21 is a view showing a menu display example for each drop position when a plurality of files are dropped to a tree portion 1101 by drag-and-drop using a right click.

FIG. 21 is a view showing a menu display example at each drop position when a plurality of files are dropped to the tree portion 1101 by drag-and-drop using a right click. Similar to a single file, when files are dragged and dropped to an insertion position by a right click, a menu dialog as shown in FIG. 15 is displayed by the bookbinding application 104, and the user can select an arbitrary item from the dialog. When a plurality of files are to be inserted at the top of the tree portion, as represented by 2101, "insert all files as pages" (1503) is grayed out so as not to select it.

When a plurality of selected files include an image file, the image file is arranged at the end of inserted objects.

Cases wherein a plurality of files are dropped to positions 2101, 2102, 2103, and 2104 will be explained.

Figure 22A:
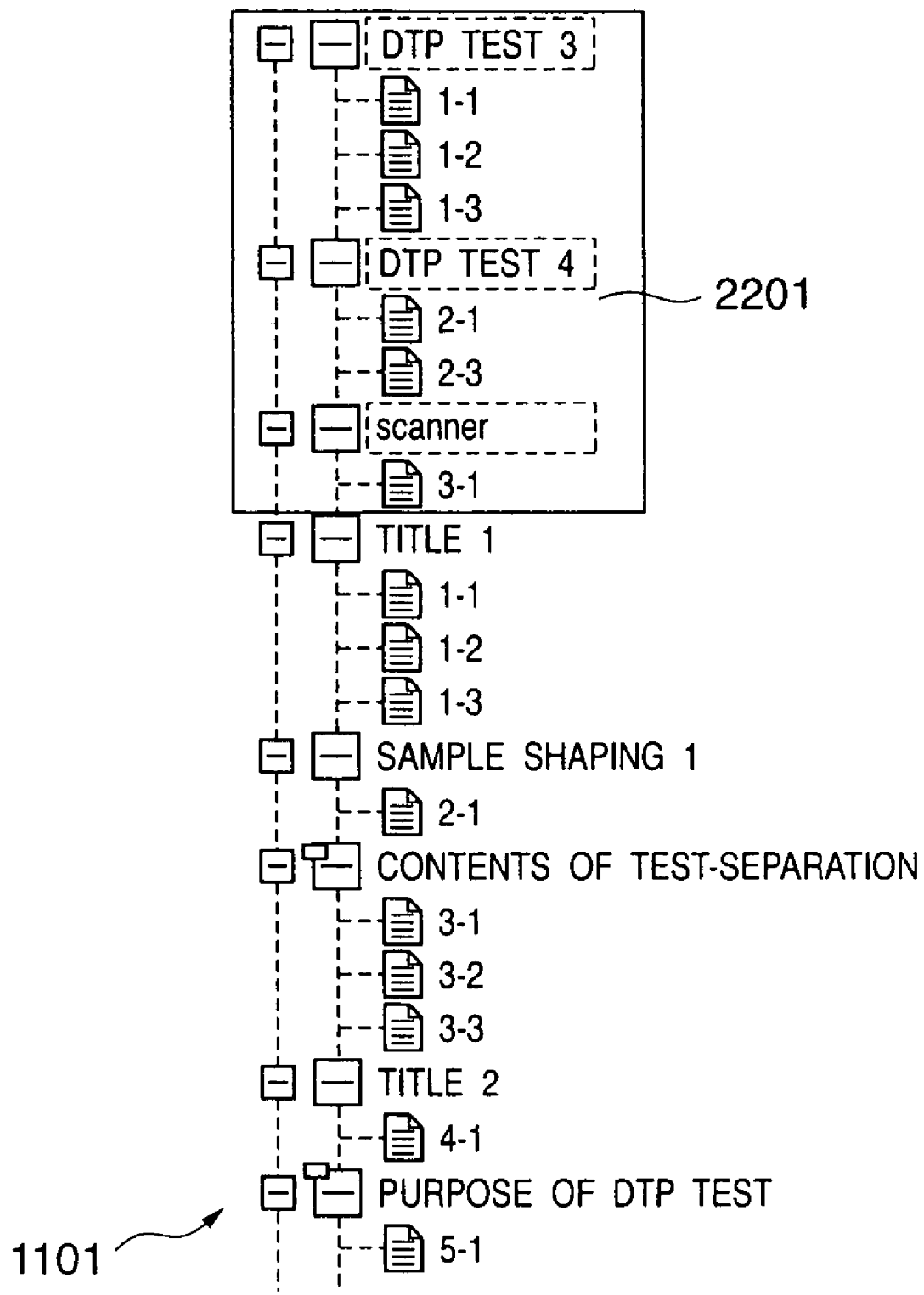
FIGS. 22A, 22B, 23A to 23C, 24A to 24C, and 25A to 25C are views showing examples of a result of inserting a plurality of files by drag-and-drop using a right click.
Figure 22B:
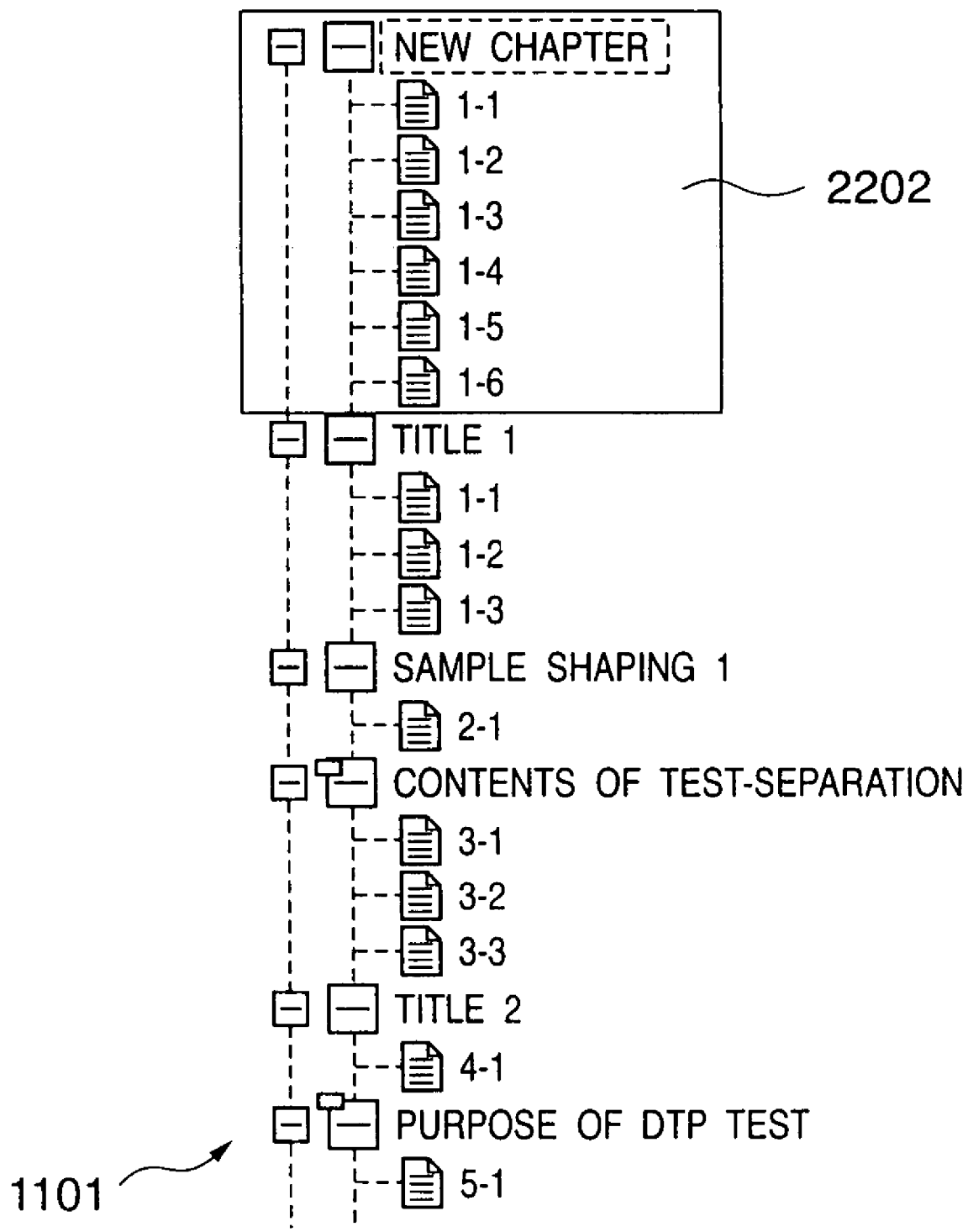

A case wherein a plurality of designated files ("DTPtest3.doc", "DTPtest4.doc", and "scanner.jpg") are inserted to the position 2101 which is the start position of the document will be first described. In this case, "insert all files as pages" (1503) cannot be selected, as described above, and only either "create chapters by the number of files" (1501) or "insert all files to one chapter" (1502) can be selected. If the item 1501 is selected from the menu, a chapter having a name corresponding to the file name of each file is created for the file by the bookbinding application 104, and pages corresponding to each chapter are inserted, as represented by 2201 in FIG. 22A. If the item 1502 is selected from the menu, all files are inserted as pages to a chapter newly created by the bookbinding application 104, as represented by 2202 in FIG. 22B.

Figure 23A:
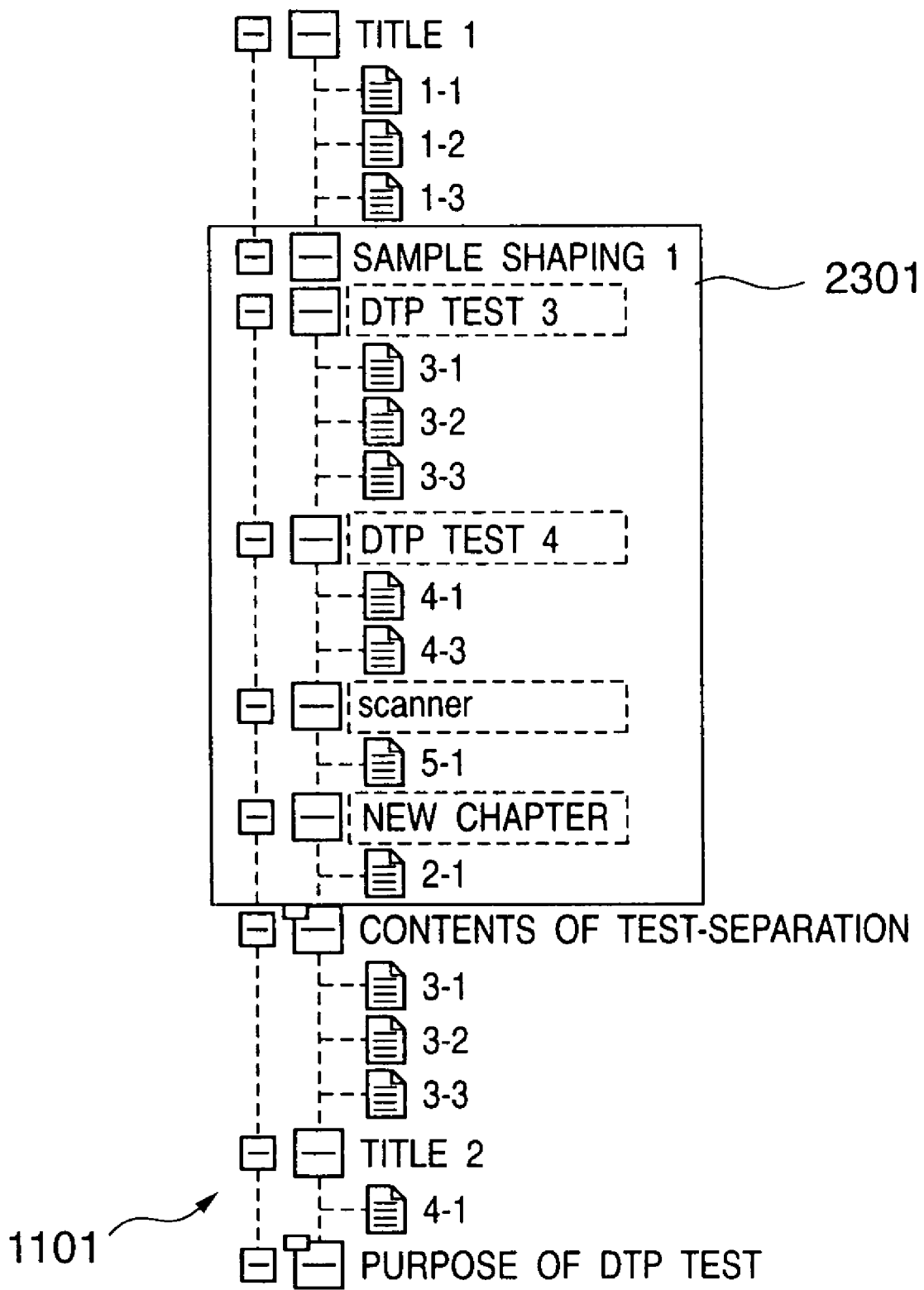

A case wherein a plurality of files are dropped to the position 2102 between the chapter name ("sample shaping 1") and the first page (2-1) will be described. In this case, if "create chapters by the number of files" (1501) is selected from the menu, a chapter having a name corresponding to the file name of each file is created for the file from a position immediately before the first page (2-1) of the chapter "sample shaping 1" by the bookbinding application 104, and pages corresponding to each chapter are inserted, as represented by 2301 in FIG. 23A. In this case, a new chapter is created after the added chapters, and document pages in the chapter "sample shaping 1" are moved to the created chapter.

Figure 23B:
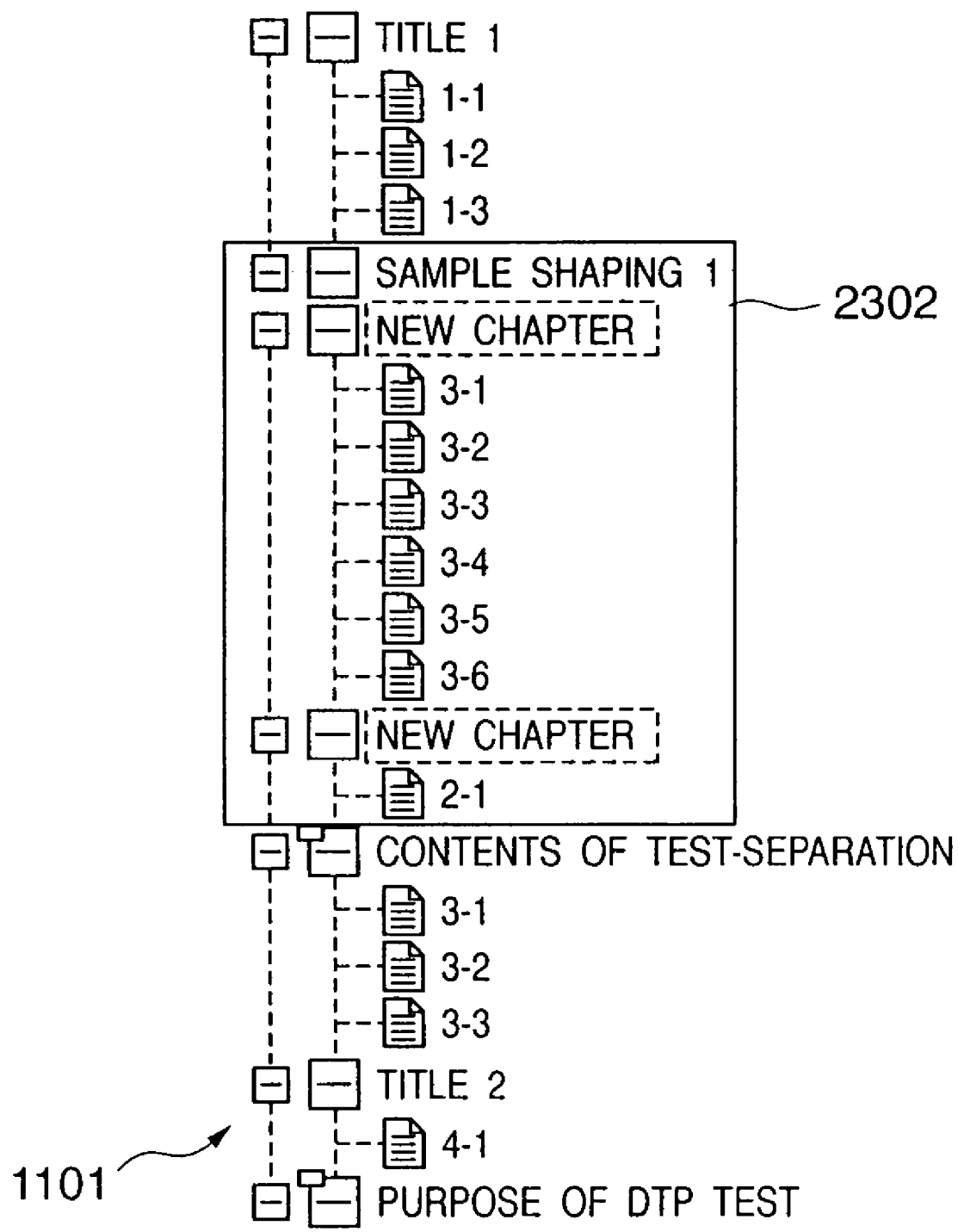

If a plurality of files are dropped to the position 2102 and "insert all files to one chapter" (1502) is selected from the menu, a new chapter is created at a position immediately before the first page (2-1) of the chapter "sample shaping 1" by the bookbinding application 104, and all files are added as pages to the chapter, as represented by 2302 in FIG. 23B. Another new chapter is created after the added chapter, and document pages at the insertion position are moved to the created chapter.

Figure 23C:
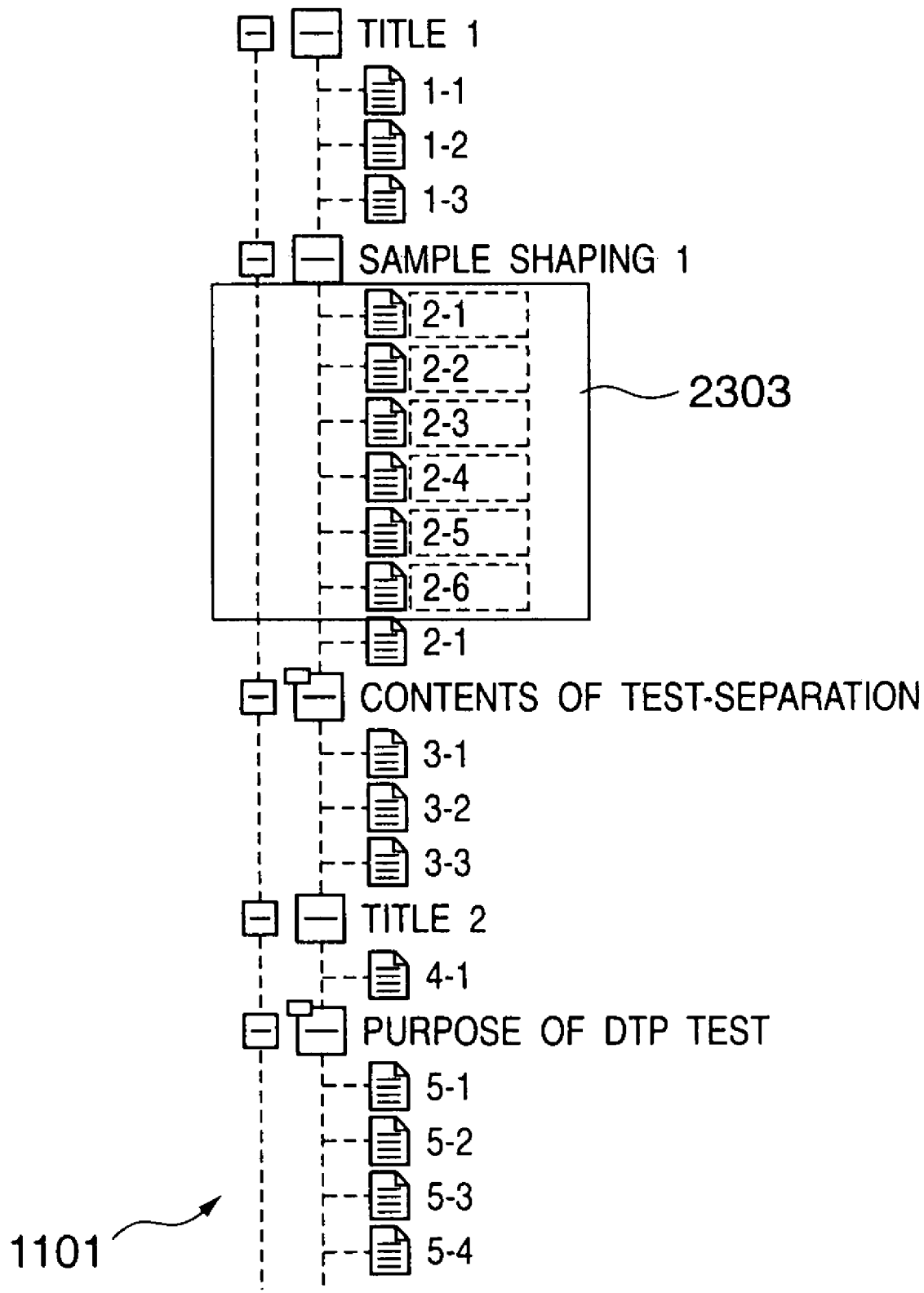

If a plurality of files are dropped to the position 2102 and "insert all files as pages" (1503) is selected from the menu, all files are inserted as pages from a position immediately before the first page of the chapter "sample shaping 1" by the bookbinding application 104, as represented by 2303 in FIG. 23C.

Figure 24A:
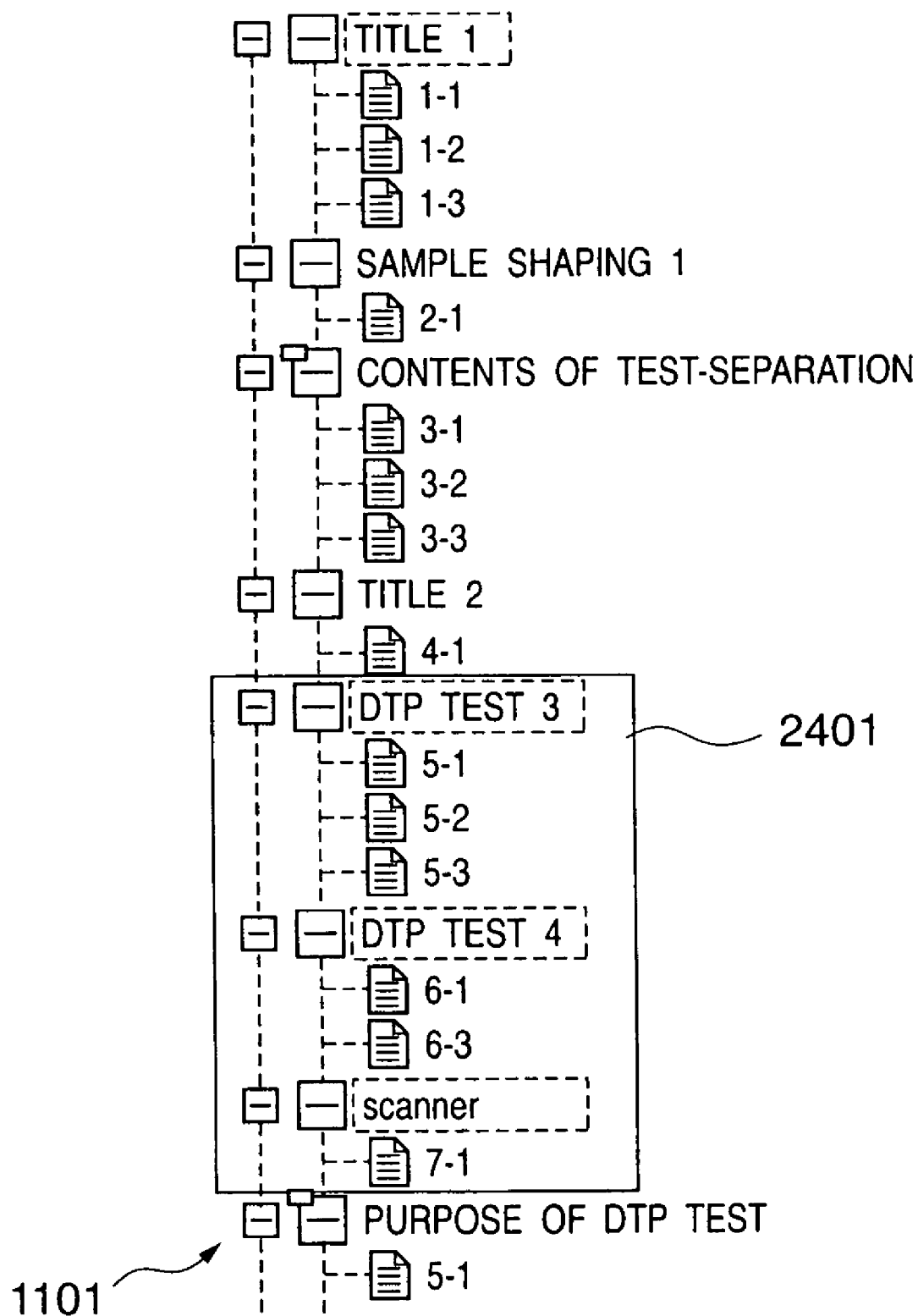
Figure 24B:
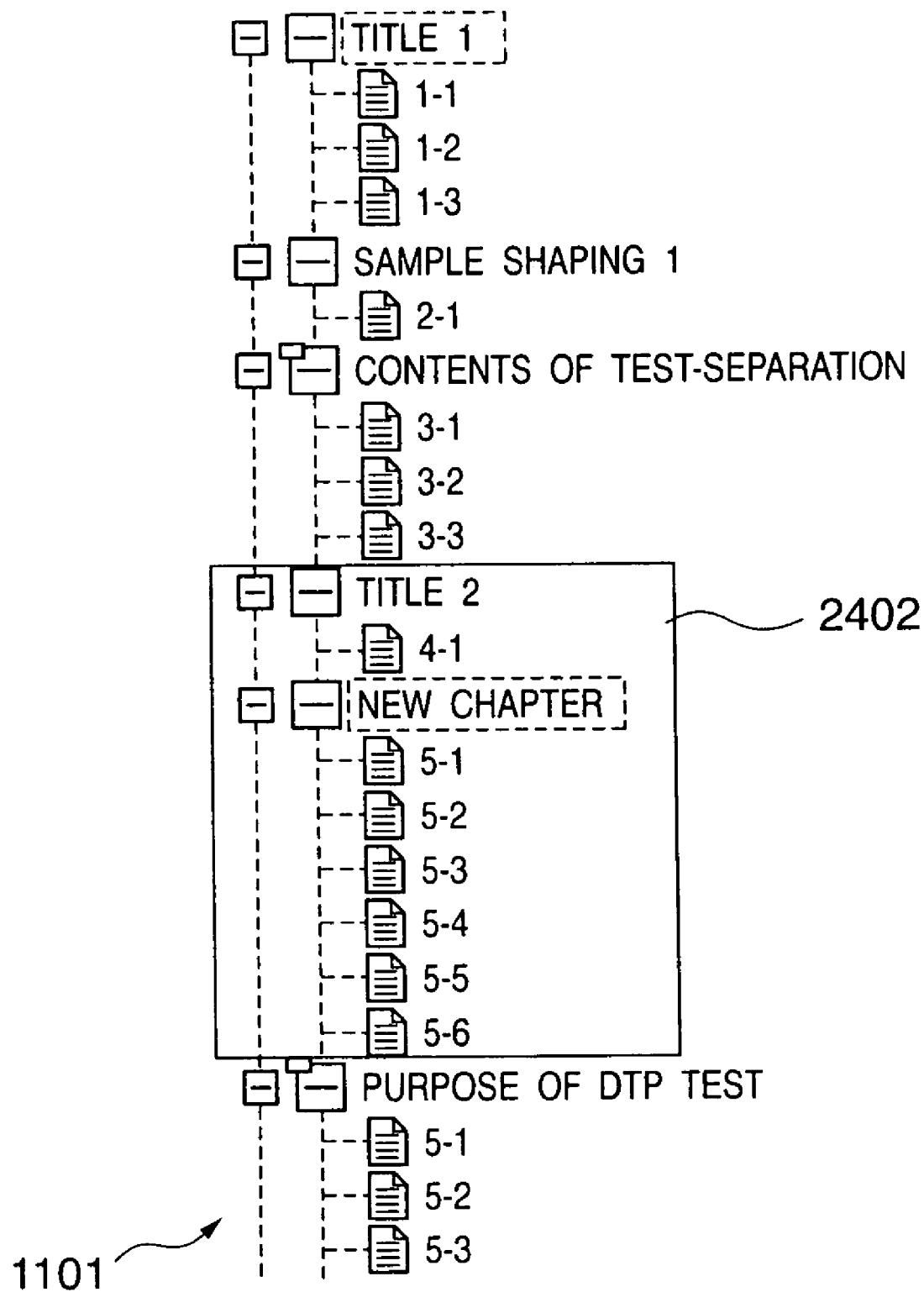
Figure 24C:
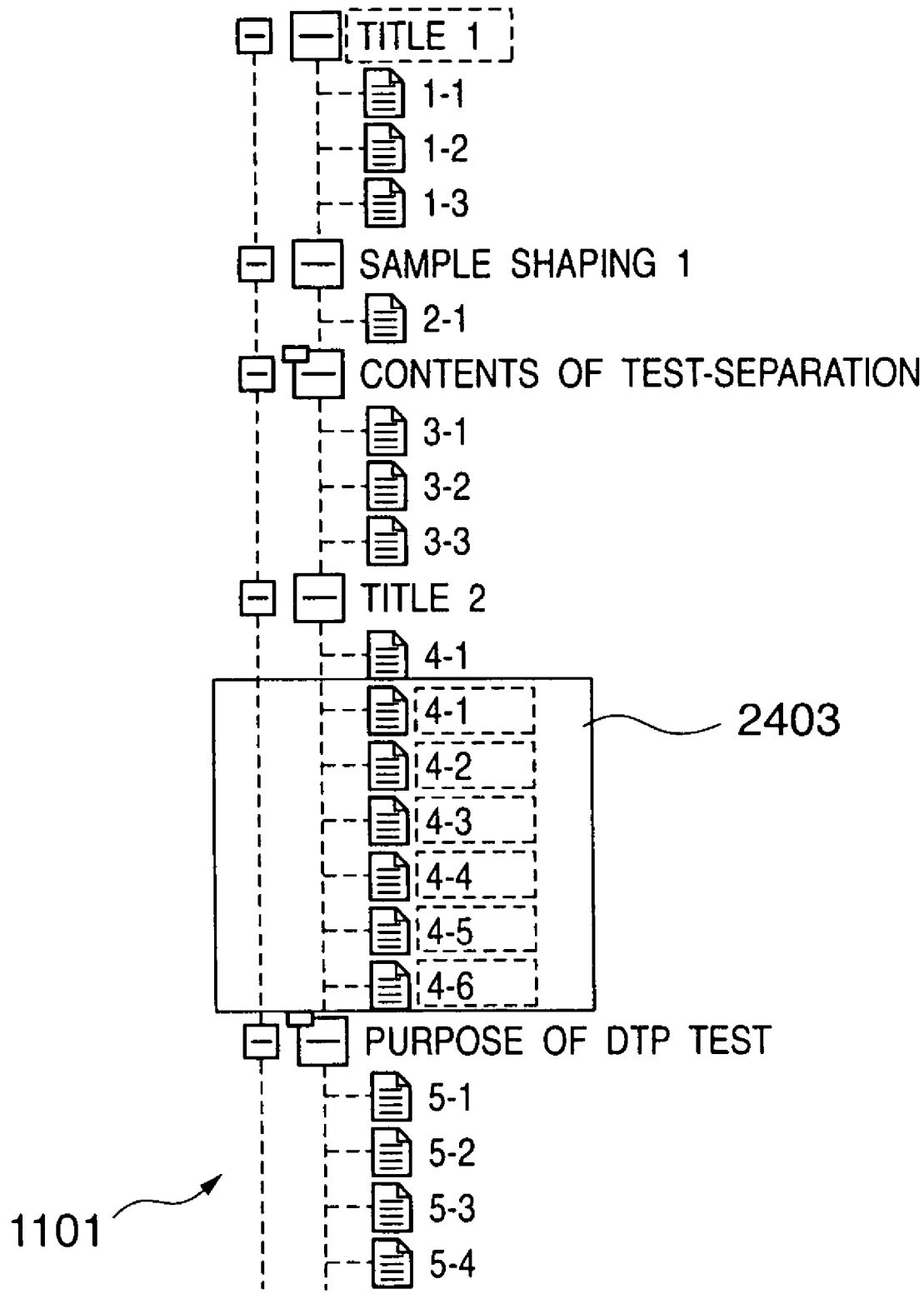

A case wherein a plurality of files are dropped to the position 2103 between the chapter name ("purpose of DTP test") and the final page (4-1) of the immediately preceding chapter ("title 2") will be described. In this case, if "create chapters by the number of files" (1501) is selected from the displayed menu, a chapter having a name corresponding to the file name of each file is created for the file from a position immediately before the first page (5-1) of the chapter "purpose of DTP test" by the bookbinding application 104, and pages corresponding to each chapter are inserted, as represented by 2401 in FIG. 24A. If a plurality of files are dropped to the position 2103 and "insert all files to one chapter" (1502) is selected from the displayed menu, a new chapter is created at the drop position by the bookbinding application 104, and all files are added as pages to the chapter, as represented by 2402 in FIG. 24B. If a plurality of files are dropped to the position 2103 and "insert all files as pages" (1503) is selected from the displayed menu, all files are inserted as pages at the end of the dropping destination chapter by the bookbinding application 104, as represented by 2403 in FIG. 24C.

Figure 25A:
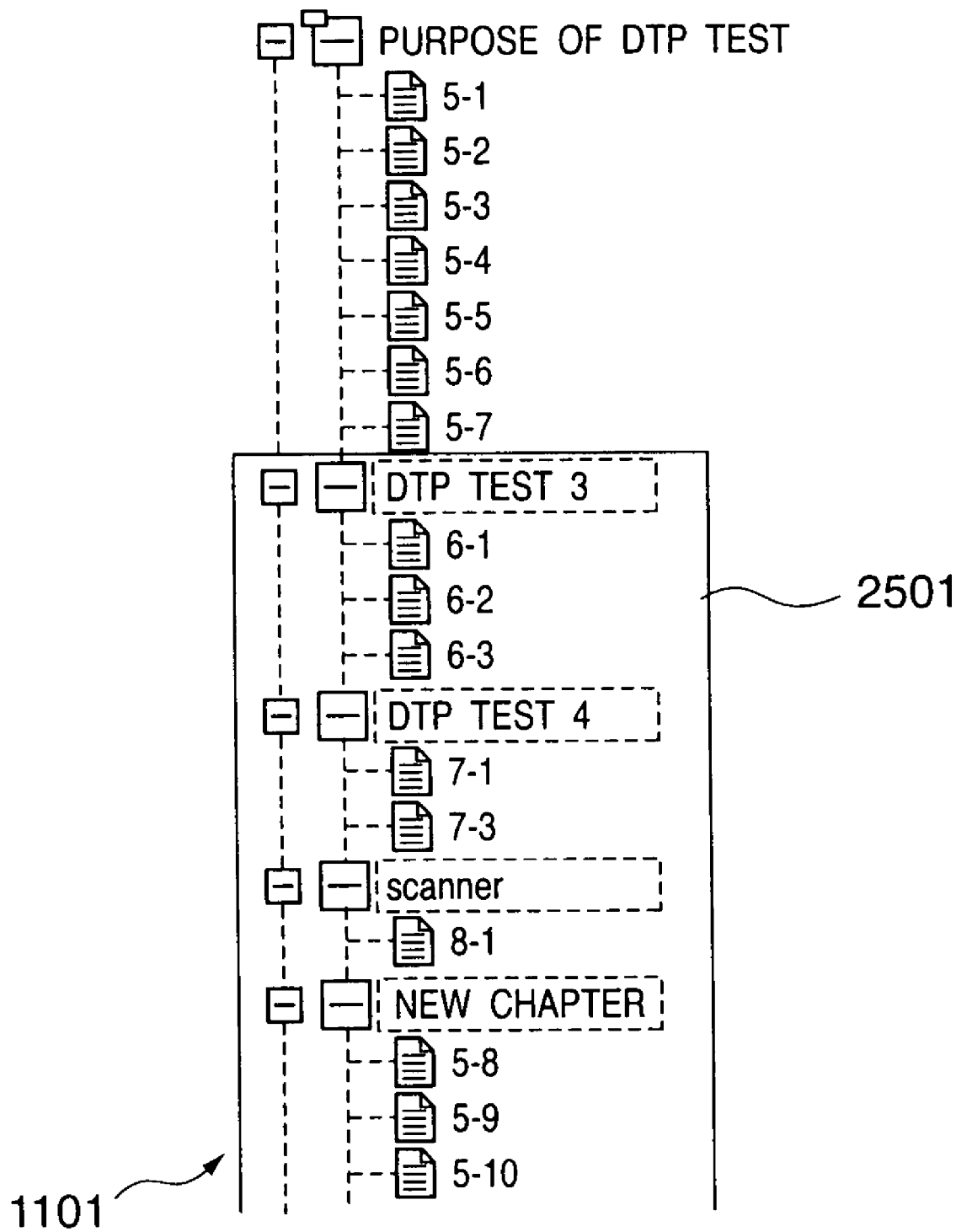

A case wherein a plurality of files are dropped to the position 2104 between pages (5-7 and 5-8) in the chapter name ("purpose of DTP test") will be described. In this case, if "create chapters by the number of files" (1501) is selected from the displayed menu, a chapter having a name corresponding to the file name of each file is created for the file at the drop position by the bookbinding application 104, and pages corresponding to each chapter are inserted, as represented by 2501 in FIG. 25A. In this case, chapters corresponding to the number of inserted files are created and added from the drop position. The remaining document pages at the drop position are moved to a "new chapter" subsequent to the inserted chapters.

Figure 25B:
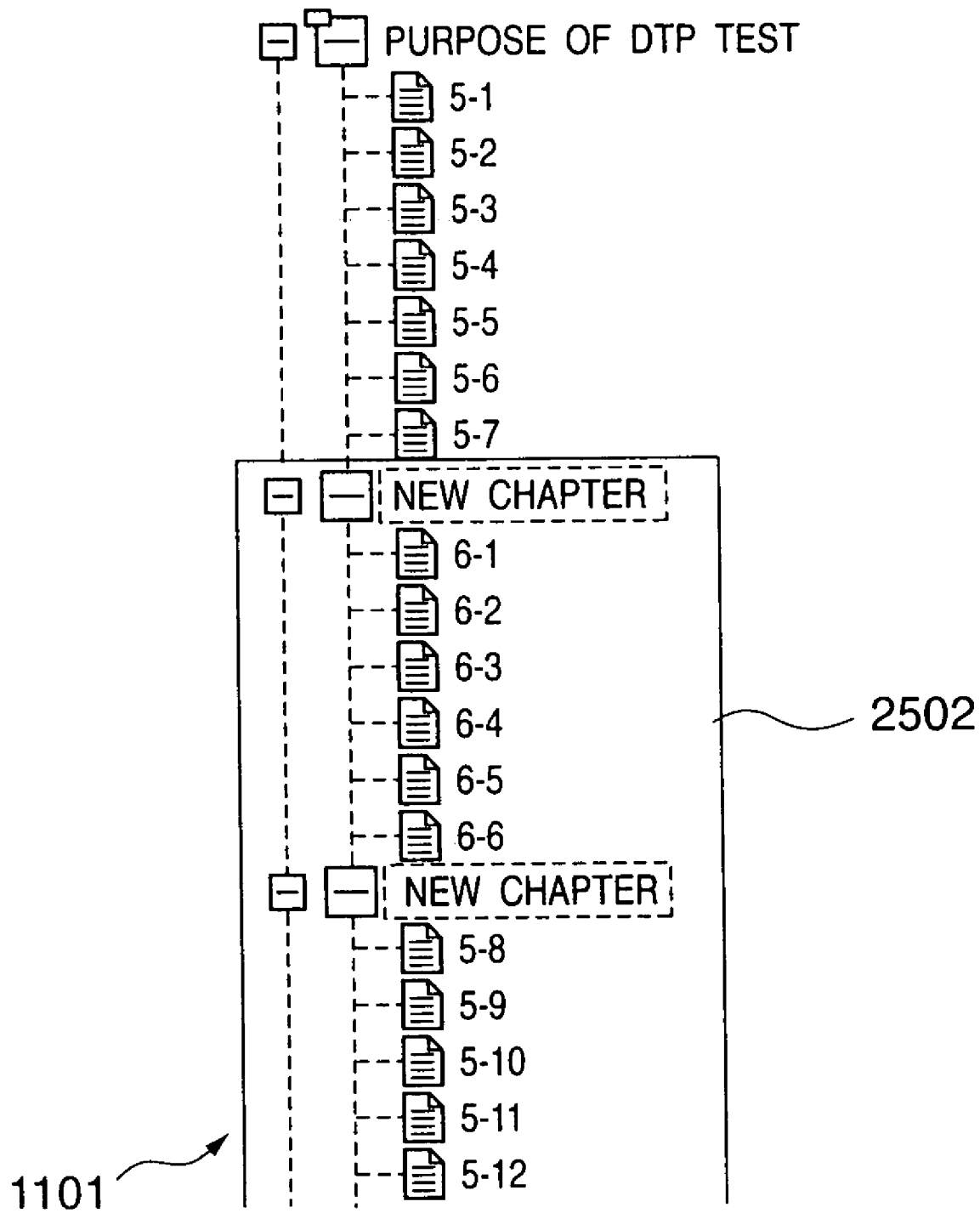
Figure 25C:
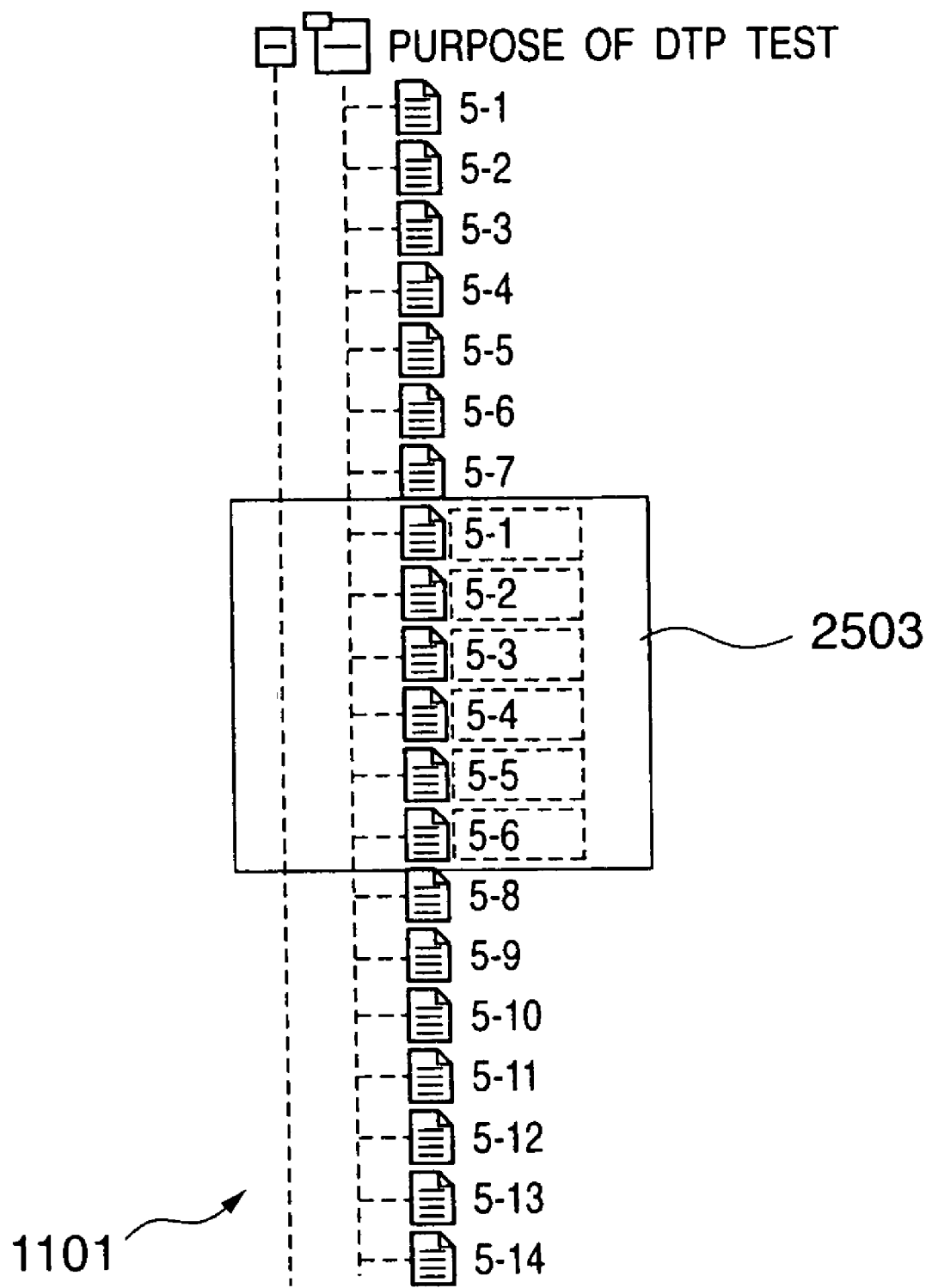

If a plurality of files are dropped to the position 2104 and "insert all files to one chapter" (1502) is selected from the displayed menu, a new chapter is created at the drop position by the bookbinding application 104, and all files are inserted as pages to the chapter, as represented by 2502 in FIG. 25B. At this time, pages after the drop position are so rearranged as to belong to another new chapter. If a plurality of files are dropped to the position 2104 and "insert all files as pages" (1503) is selected from the displayed menu, the files are inserted as pages to the drop position by the bookbinding application 104, as represented by 2503 in FIG. 25C.

The above file insertion processing is summarized as follows.

The document structure of a book file serving as the first document file is displayed as a tree. The user is prompted to select as the second document file a file to be inserted to the book file displayed as a tree. The user is prompted to designate the insertion position of the second document file in the displayed document structure of the first document file, thus inputting the designation. In response to the designation of the insertion position, the bookbinding application 104 presents, to the user, document structure type candidates for the second document file in inserting the second document file to the insertion position. If the user selects any document structure type from the presented candidates, the bookbinding application 104 inserts the second document file to the insertion position on the basis of the selected document structure type.

According to the above-described embodiment, a menu which allows the user to select how to insert a file is displayed in inserting the file by drag-and-drop. The user can easily insert the file in a desired format. At the same time as file insertion, the chapter structure can be arranged, reducing the labor of the user and increasing the creation efficiency.

In the above-described embodiment, a 2-button mouse as shown in FIG. 2 is adopted, and file insertion operation by drag-and-drop is changed between left and right clicks. In general, assignment of a predetermined file operation to a button can be changed by settings. That is, assignment to each button in the above-described embodiment is merely an example which exhibits the best conceivable mode at present. Hence, contents assigned to each button of the mouse in the above-described embodiment can be exchanged between the right and left buttons.

Drag-and-drop is not limited to mouse operation, and the same processing as drag-and-drop operation using a right click can also be executed by drag-and-drop using a left click while pressing the "Shift" key of the keyboard.

Assume that drag-and-drop using a right click is defined as the first operation processing, and drag-and-drop using a left click is defined as the second operation processing. The document management application (bookbinding application 104) according to the present invention controls to automatically add a target file to an existing book file when the second operation processing is done, and to display a menu for designating how to add a target file to an existing book when the first operation processing is done.

Further, various types of mouses are available, and the pointing device also includes a track ball in addition to the mouse. The above-described file operation can also be assigned using such pointing device different from that in the embodiment.

(Other Embodiments)

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A document processing method executed in a document processing apparatus, comprising:
   (a) first displaying step of displaying a first document file in a display region;
   (b) inputting step of inputting an insertion instruction to insert at least one second document file into a specified insertion position in the display region using a first or a second inputting method;
   (c) judging step of judging whether the first or the second inputting method is used for inputting the insertion instruction in said inputting step;
   (d) first determining step of determining an insertion method for the at least one second document file from a plurality of insertion methods using an attribute of the at least one second document file, when the judging step judges that the first inputting method is used;
   (e) second displaying step of displaying a menu dialog including a plurality of choices corresponding to the plurality of insertion methods when the judging step judges that the second inputting method is used;
   (f) second determining step of determining the insertion method for the at least one second document file from the plurality of insertion methods, based on a choice selected from the plurality of choices in the menu dialog; and
   (g) inserting step of inserting the at least one second document file into the first document file on the basis of the insertion method determined in said first determining step or said second determining step;
   wherein the plurality of insertion methods include at least a first insertion method in which one chapter is newly generated at the insertion position and the at least one second document file is inserted into the newly generated chapter, and a second insertion method in which the at least one second document file is inserted into an existing chapter at the insertion position.

2. The method according to claim 1, wherein in said second displaying step, the plurality of choices included in the menu dialog are determined based on at least one of the insertion position of the at least one second document file and the number of second document files.

3. The method according to claim 2, wherein, if the insertion position specified by using the second inputting method indicates a chapter preceding the first chapter of the first document file that is already displayed in the display region, said second displaying step displays the menu dialog including the first insertion method, otherwise if the insertion position specified by using the second inputting method does not indicate a chapter preceding the first chapter of the first document file that is already displayed in the display region, said second displaying step displays the menu dialog including the first and the second insertion methods.

4. The method according to claim 2,
   wherein in said second displaying step, the plurality of choices included in the menu dialog correspond to the first and the second insertion methods and a third insertion method in which chapters for a plurality of second document files are newly generated, when an insertion instruction to insert the plurality of second document files to the first document file using the second inputting method is inputted.

5. The method according to claim 1, wherein the document processing apparatus comprises:
   a general application;
   an electronic document despooler configured to generate a document file based on application data output from the general application; and
   a bookbinding application configured to display the document file generated by the electronic document despooler.

6. A document processing apparatus comprising:
   a memory unit;
   an input device;
   a display device; and.
   a processor coupled to the memory unit, the input device and the display device, wherein the processor executes a computer-readable program stored in the memory unit, the program comprising code for making the document processing apparatus execute:

(a) first displaying step of displaying a first document file in a display region of the display device:

(b) inputting step of using the input device to insert an insertion instruction to insert at least one second document file into a specified insertion position in the display region using a first or a second inputting method;

(c) judging step of judging whether the first or second inputting method is used for inputting the insertion instruction in said inputting step;

(d) first determining step of determining an insertion method for the at least one second document file from a plurality of insertion methods using an attribute of the at least one second document file, when the judging step judges that the first inputting method is used:

(e) second displaying step of displaying on the display device a menu dialog including a plurality of choices corresponding to the plurality of insertion methods when the judging step judges that the second inputting method is used:

(f) second determining step of determining the insertion method for the at least one second document file from the plurality of insertion methods, based on a choice selected from the plurality of choices in the menu dialog: and (g) inserting step of inserting the at least one second document file into the first document file an the basis of the insertion method determined in said first determining step or said second determining step;

wherein the plurality of insertion methods include at least a first insertion method in which one chapter is newly generated at the insertion position and the at least one second document file is inserted into the newly generated chapter, and a second insertion method in which the at least one second document file is inserted into an existing chapter at the insertion position.

7. The apparatus according to claim 6, wherein when the processor displays the menu dialog, the plurality of choices included in the menu dialog are determined based on at least one of the insertion position of the at least one second document file and the number of second document files.

8. The apparatus according to claim 7,
wherein the plurality of choices included in the menu dialog correspond to the first and the second insertion methods and a third insertion method in which chapters for a plurality of second document files are newly generated, when an insertion instruction to insert the plurality of second document files to the first document file using the second inputting method is inputted.

9. The apparatus according to claim 7, wherein, if the insertion position specified by using the second inputting method indicates a chapter preceding the first chapter of the first document file that is already displayed in the display region, the processor displays the menu dialog including the first insertion method, otherwise if the insertion position specified by using the second inputting method does not indicate a chapter preceding the first chapter of the first document file that is already displayed in the display region, the processor displays the menu dialog including the first and second insertion methods.

10. The apparatus according to claim 6, further comprising:

a general application;

an electronic document despooler configured to generate a document file based on application data output from the general application; and a bookbinding application configured to display the document file generated by the electronic document despooler.

11. A computer-executable program stored on a computer readable storage medium, the program comprising code for making a document processing apparatus execute:

(a) first displaying step of displaying a first document file in a display region;

(b) inputting step of inputting an insertion instruction to insert at least one second document file into a specified insertion position in the display region using a first or a second inputting method;

(c) judging step of judging whether the first or the second inputting method is used for inputting the insertion instruction in said inputting step;

(d) first determining step of determining an insertion method for the at least one second document file from a plurality of insertion methods using an attribute of the at least one second document file, when the judging step judges that the first inputting method is used;

(e) second displaying step of displaying a menu dialog including a plurality of choices corresponding to the plurality of insertion methods when the judging step judges that the second inputting method is used;

(f) second determining step of determining the insertion method for the at least one second document file from the plurality of insertion methods, based on a choice selected from the plurality of choices in the menu dialog; and (g) inserting step of inserting the at least one second document file into the first document file on the basis of the insertion method determined in said first determining step or said second determining step;

wherein the plurality of insertion methods include at least a first insertion method in which one chapter is newly generated at the insertion position and the at least one second document file is inserted into the newly generated chapter, and a second insertion method in which the at least one second document file is inserted into an existing chapter at the insertion position.

12. The program according to claim 11, wherein in said second displaying step, the plurality of choices included in the menu dialog are determined based on at least one of the insertion position of the at least one second document file and the number of second document files.

13. The program according to claim 12, wherein, if the insertion position specified by using the second inputting method indicates a chapter preceding the first chapter of the first document file that is already displayed in the display region, said second displaying step displays the menu dialog including the first insertion method, otherwise if the insertion position specified by using the second inputting method does not indicate a chapter preceding the first chapter of the first document file that is already displayed in the display region, said second displaying step displays the menu dialog including the first and the second insertion methods.

14. The program according to claim 12,
wherein in said second displaying step, the plurality of choices included in the menu dialog correspond to the first and the second insertion methods and a third insertion method in which chapters for a plurality of second document files are newly generated, when an insertion instruction to insert the plurality of second document files to the first document file using the second inputting method is inputted.

15. The program according to claim 11, wherein the document processing apparatus comprises:

a general application;

an electronic document despooler configured to generate a document file based on application data output from the general application; and a bookbinding application configured to display the document file generated by the electronic document despooler.

* * * * *

UNITED STATES PATENT AND TRADEMARK OFFICE
CERTIFICATE OF CORRECTION

PATENT NO.        : 7,379,950 B2                                      Page 1 of 1
APPLICATION NO.   : 10/734262
DATED             : May 27, 2008
INVENTOR(S)       : Sato et al.

It is certified that error appears in the above-identified patent and that said Letters Patent is hereby corrected as shown below:

COLUMN 19:
      Line 33, "an the basis" should read -- on the basis --.

Signed and Sealed this

Eleventh Day of November, 2008

JON W. DUDAS
*Director of the United States Patent and Trademark Office*